(12) United States Patent
Blumenfeld et al.

(10) Patent No.: US 9,317,609 B2
(45) Date of Patent: Apr. 19, 2016

(54) SEMANTIC VECTOR IN A METHOD AND APPARATUS FOR KEEPING AND FINDING INFORMATION

(71) Applicant: FortyTwo, Inc., Mountain View, CA (US)

(72) Inventors: Danny Blumenfeld, Los Altos, CA (US); Yasuhiro Matsuda, Palo Alto, CA (US); Eishay Smith, Sunnyvale, CA (US)

(73) Assignee: FortyTwo, Inc., Mountain View, CA (US)

( * ) Notice: Subject to any disclaimer, the term of this patent is extended or adjusted under 35 U.S.C. 154(b) by 249 days.

(21) Appl. No.: 14/043,771

(22) Filed: Oct. 1, 2013

(65) Prior Publication Data

US 2014/0280312 A1 Sep. 18, 2014

Related U.S. Application Data

(60) Provisional application No. 61/784,860, filed on Mar. 14, 2013.

(51) Int. Cl.
*G06F 17/30* (2006.01)

(52) U.S. Cl.
CPC .... *G06F 17/30864* (2013.01); *G06F 17/30442* (2013.01)

(58) Field of Classification Search
USPC .......................... 707/674, 687, 749, 776, 791
See application file for complete search history.

(56) References Cited

U.S. PATENT DOCUMENTS

| 2011/0184983 | A1* | 7/2011 | Kwantes ........... G06F 17/30716 707/776 |
| 2011/0276563 | A1 | 11/2011 | Sandoval et al. |
| 2012/0278341 | A1* | 11/2012 | ogilvy ................... G06Q 10/00 707/749 |
| 2013/0013603 | A1 | 1/2013 | Parker et al. |
| 2014/0325601 | A1 | 10/2014 | Sun et al. |
| 2015/0046425 | A1 | 2/2015 | Lin et al. |
| 2015/0046779 | A1 | 2/2015 | Akselrod et al. |

\* cited by examiner

*Primary Examiner* — Sana Al Hashemi
(74) *Attorney, Agent, or Firm* — Michael A. Glenn; Perkins Coie LLP

(57) ABSTRACT

A semantic vector is generated for a search term based upon a global frequency of other, closely related terms within a corpus that is used to compute the semantic vector relative to the search term. The semantic vector is used in connection with a textual search engine, responsive to a user query comprising a search term, to promote any of documents and sites within results returned to the query by the search engine that contain other, closely related terms that strongly correlate with the search term.

8 Claims, 24 Drawing Sheets

31

Example search results for query "apple"

1: Apple Inc.
   www.apple.com
2: Apple Picking Orchards
   www.redtri.com/apple-picking-with-kids
3: Apple - My Apple ID
   appleid.apple.com
4: AAPL Stock Price Today
   quotes.wsj.com/AAPL

FIGURE 17

SEMANTIC VECTOR IN A METHOD AND APPARATUS FOR KEEPING AND FINDING INFORMATION

CROSS REFERENCE TO RELATED APPLICATIONS

This application claims priority to U.S. provisional patent application Ser. No. 61/784,860, filed Mar. 14, 2013, which application is incorporated herein in its entirety by this reference thereto.

BACKGROUND OF THE INVENTION

1. Technical Field

The invention relates to finding information that is contained in an enterprise or network. More particularly, the invention relates to keeping and finding information.

2. Description of the Background Art

Finding information contained in an enterprise or network is frustrating and inefficient.

We Bookmark a Lot but we Rarely Re-Use Our Bookmarks

People bookmark a lot but rarely visit their bookmark folder again, even if it is exactly what they need. Instead, they spend time searching for what they have already saved.

Searching is not Easy

Usually it takes a long time to actually find what we are looking for.

- The Internet is packed with an enormous amount of information. The more it grows, the harder it is to find what you really need quickly.
- Most people actually type only one or two words in the search engine, which makes it extremely hard for the search engines to come up with a good result.
- Search engine optimization (SEO) is the process of affecting the visibility of a website or a web page in a search engine's "natural" or un-paid ("organic") search results. In general, the earlier (or higher ranked on the search results page), and more frequently a site appears in the search results list, the more visitors it will receive from the search engine's users. As an Internet marketing strategy, SEO considers how search engines work, what people search for, the actual search terms or keywords typed into search engines and which search engines are preferred by their targeted audience.

Human Behavioral Pattern: Amongst all the Voices Out there, we Trust the People we Know Most These are our personal experts: the Tech God, the Foodie, the Urban Traveller, the money guy, the designer, the best student in class, the party dude, the athlete, the philosopher, the gamer, and the young parent. Often, our close friends have already invested time researching something that we are researching now. We rely on their expertise and friendship for quick and trustworthy information.

In Short:

We spend a lot of time saving, or keeping, pages online to find them easily later but, instead of using those bookmarks, we often search for the same pages again and again. And if we can not find what we are looking for ourselves, we turn to our friends for help.

SUMMARY OF THE INVENTION

In a method for keeping and finding information, a semantic vector is generated for a search term based upon a global frequency of other, closely related terms within a corpus that is used to compute the semantic vector relative to the search term. The semantic vector is used in connection with a textual search engine, responsive to a user query comprising a search term, to promote any of documents and sites within results returned to the query by the search engine that contain other, closely related terms that strongly correlate with the search term.

BRIEF DESCRIPTION OF THE DRAWINGS

FIG. 17 is a screen shot showing results returned in response to a search query according to the invention;

DETAILED DESCRIPTION OF THE INVENTION

Overview

The invention is referred to herein as the KiFi method and apparatus for keeping and finding information ("KiFi"), which is a shortened form of the tagline "Keep It, Find It." The following discussion initially describes KiFi at a high level and then proceeds to provide details of presently preferred embodiments of the invention. Applicant intentionally uses the second person in portions of the following discussion for didactic purposes.

Keep it—No More Bookmarks, Just Keeps

KiFi lets you and your friends easily Keep anything. With one click of a button, the KiFi slider opens on your screen to let you keep that page in your virtual, cloud-based brain. There is no need to tag the page, place it in a folder, rename it, etc. KiFi takes care of everything automatically. Because Kifi is cloud-based, anything digital can be kept online: a Web page, a photo, an email, a Web doc.

Find it—Stop Searching and Start Finding

When you search for anything online, your relevant Keeps appear as results alongside the search engine's results. In addition, your friends' Keeps which are relevant to your search also appear on the page.

For Example:

Let's say I want to buy a new a new SLR camera. I go to Google and type "buy a new digital slr camera," and I get 43,500,000 results, but I really hope the first page results helps me find my perfect camera. Instead I get results such as:

Don't buy DSLRs—3rd Gen Cameras are the Future
Digital SLR Buying Guide—CNET Reviews
Help! Buying new DSLR camera!

(and more mediocre results that I need to browse through).

And of course, thanks to SEO, the links I find take me to Amazon and Google Shopping, which means I need to keep on searching once I click through. I'll probably spend a lot of time searching, researching, and validating many Websites or pages until I make my decision. I'll probably also call a few of my photography-expert friends who I trust for more information and validation about what they prefer before I make my move.

Figure 1:
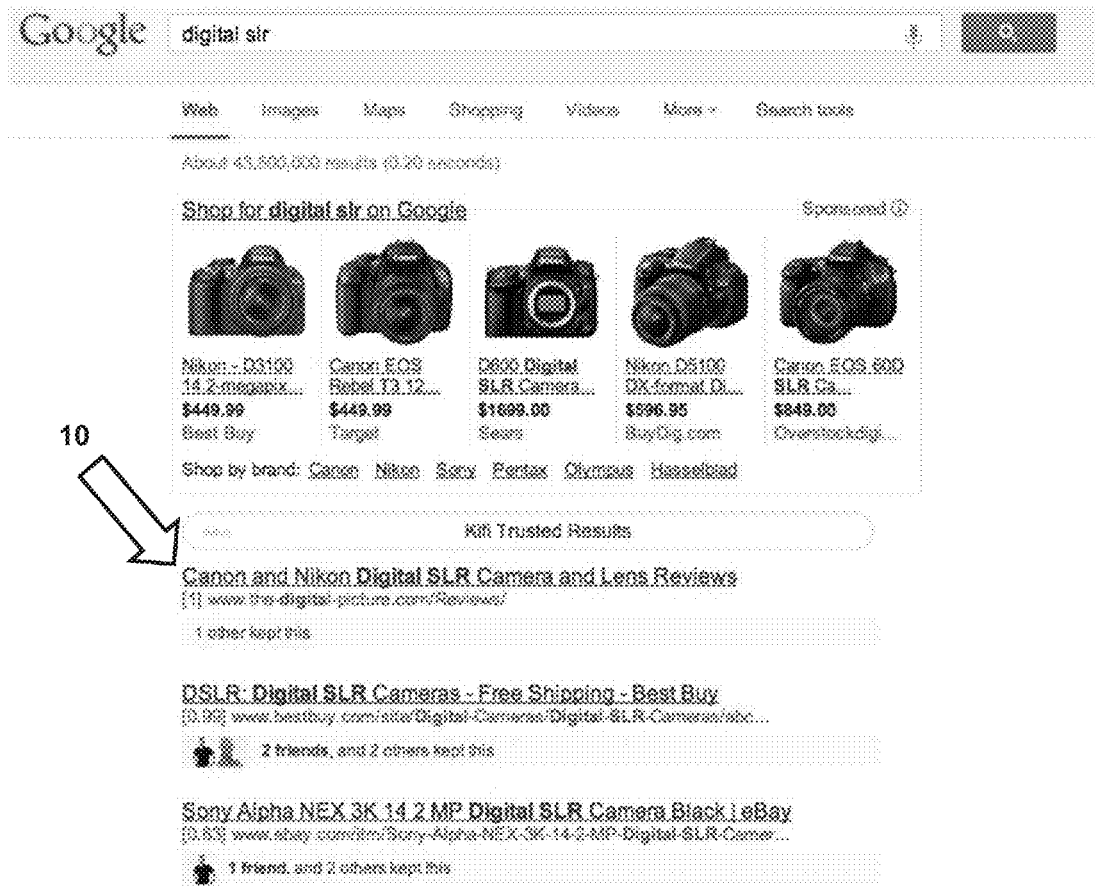
FIG. 1 is a screenshot showing an example of the results returned in response to a search query according to the invention.

With KiFi, I search Google and I see KiFi's trusted results 10 immediately inside the Google results page (see FIG. 1). Quickly scanning the results, I immediately see:

A few pages I kept using KiFi;
Older bookmarks on digital cameras I'd forgotten about, from the last time I did research; and
A link kept by my friends Joe and Mike, who both know a lot more than I do about SLR cameras, i.e. people I would've called to get trusted information. I know that my friends spent the time curating those links, slowly becoming experts I can rely on, and more than that, they felt those links were important to keep and share using KiFi.

In almost no time at all, I have trusted links that also leverage the research and expertise of my friends. With a quick search, I can Find the right camera for me at the right price.

Conclusion:

KiFi makes it easy to search and find what you're really looking for. It helps you Find the page that you want, the right product to buy, and provides the confidence needed to make the right decision, all socially validated by the people you trust.

How KiFi Works

Socially Validated Search Results

Throughout our lives we seek validation from those we trust the most: the people we know. All of us have friends we call when we need help, information, and validation. We want to feel that we're doing the right thing, and there is someone we trust who can validate our decisions, i.e. our friends, our personal experts.

After all, we're social animals. We each have an innate desire to belong to a social group. It is precisely because we value this sense of belonging so highly that the more other people find an idea, trend, or position appealing or correct, the more correct that idea becomes in our own minds.

How do we Use Social Validation in Our Daily Life?

For Example:

Let's say we plan a family vacation to Disneyland. We'll spend a lot of time researching before we hit the road. We'll go online and check for information, try to find reviews, look at photos and videos hoping to find the best hotel, the best time to hit the road, the optimal number of days before the kids just lose it, great restaurants, and maybe a babysitter so we can take the night off.

Picking our brain, we remember our good friends Gina and Andrew. They just came back from a successful Disneyland vacation with their kids, and we know they spent a lot of time researching online and offline trying (like us) to find their dream vacation. Gina and Andrew are the two of the "Disneyland vacation experts" we need. We call them and after a few minutes on the phone we get great information we can rely on, and even some helpful tips.

In short: our friends spent the time researching; they just came back from their successful vacation; we know them personally; and we trust them.

We are all experts in more than one thing, even if it's not part of our LinkedIn page or Facebook profile. After all, an engineer can also be a great cook, a mechanic, and even an expert parent. We curate knowledge and experiences every day which are valuable for us, but wouldn't this be even more valuable for our friends and for the world?

The KiFi socially validated results do exactly this. KiFi displays a social validation layer for every result:

Photo of yourself in case you kept that link;
Photos of your most relevant friends who kept the link;
Total number of friends who kept the link;
Total number of KiFi users who kept the link;
Globe icon, indicating that the page was kept by other KiFi users who are not your friends;
KiFi Chatter icon, so you can quickly communicate with your friends about their keeps; and
Note icon, indicating if you posted a note on the link.

Imagine a find engine built just for you, based on who you are, who your friends are, and constantly evolving with you. The most important feature of search engine results is how they are ranked. We all wish that when we search, the first results would be the results we actually would like to find. This is an extremely complex problem to solve because there are so many Websites, pages, and pieces of information that are scattered everywhere. This results in millions of search results that most of the time are not relevant to what we are trying to find. People rarely click on the second results page in Google, let alone the third or the fourth. And most of the time the results we see are very similar.

For Example:

Let's say Mark and Zoe are searching for the word "Scala," a new and exciting programming language, in Google. Most of the time the results they get would be exactly the same. But Mark and Zoe are actually quite different, and they are looking for different things when they search for the same term. Mark is an 18 year old student who just started learning about Scala, while Zoe is a Scala veteran working for a young startup.

Because KiFi analyzes Mark's and Zoe's keeps, and many other parameters, the results they see from KiFi are completely different. Mark sees results kept by himself; his classmate, who is the best student in class; and other friends who are also novice Scala engineers. Zoe, on the other hand, sees results kept by her co-workers, i.e. other engineers, her friends who are Scala veterans like her, and maybe even results kept by Martin Odersky, who actually invented the Scala programming language.

Conclusion

KiFi's trusted results are personalized for you, based on who you are and who your friends are. Because we are all so very different, the results from KiFi are always very different. When searching for the same words, we each most likely see different results. It's as though someone built a search engine just for you, based on what's important for you and how you evolve in life, socially validated by people you trust.

Technology

Find Engine

Figure 2:
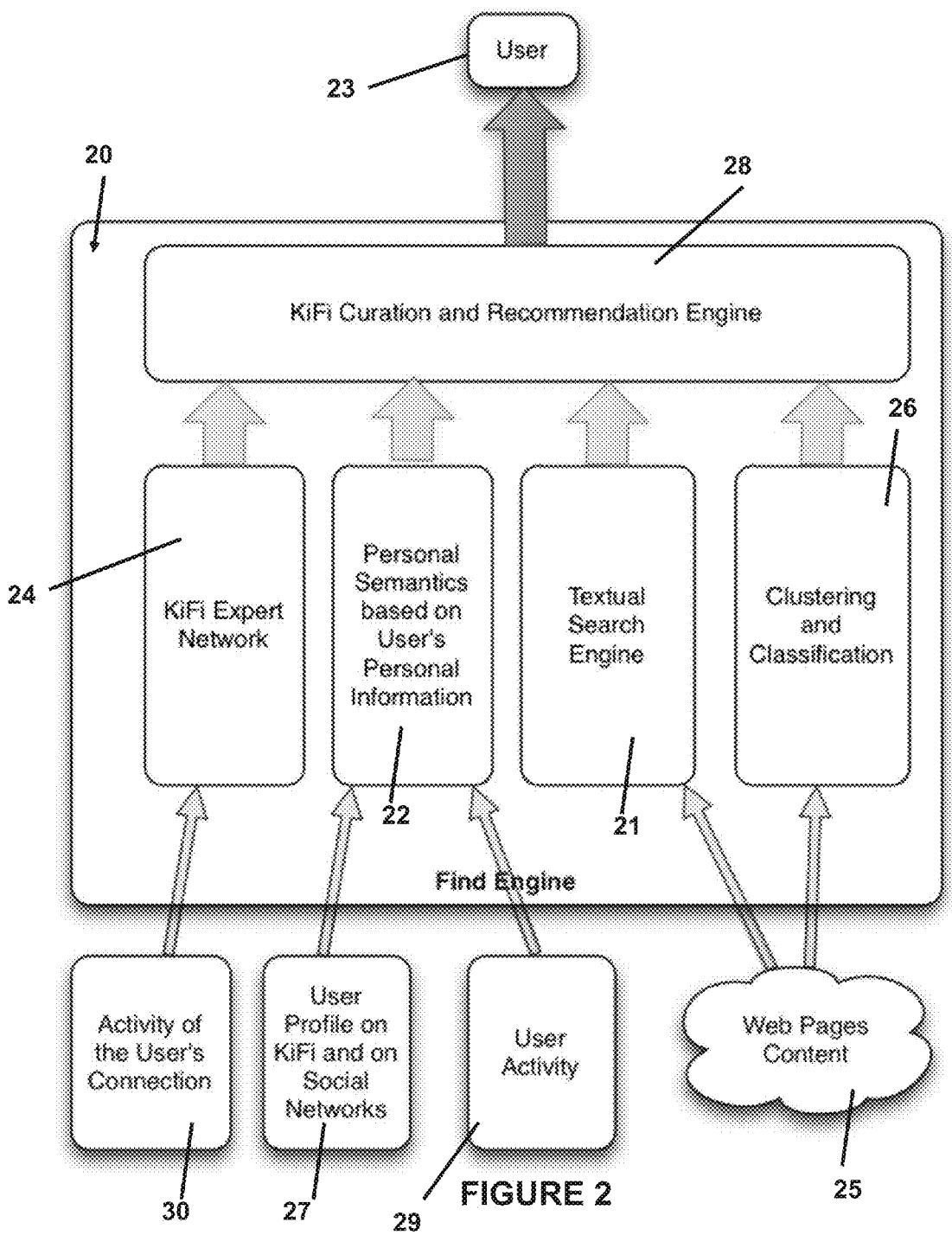
FIG. 2 is a flow diagram showing a find engine according to the invention.

The KiFi Find Engine (see FIG. 2) is a live, online, Information Retrieval, Machine Learning, and Artificial Intelligence system. The Find Engine 20 feeds textual information 25 received via a textual search engine 21 and a clustering and classification engine 26, and user events 29 and user profile information on KiFi and social networks 27 received via a personal semantics module 22, to a curating and recommendation engine 28, and produces the perfect search results that match the use's needs 23, customized by the user's behavior and needs at the time of search.

Textual Search and Semantic Vector

One of the key differentiators of the KiFi textual search engine is the use of the Semantic Vector. The Semantic Vector (SV) refers to linking a term, e.g. "Camping," with a collection of closely related terms, e.g. "campground," "RV," "campfire," "tent," "woods," "Yosemite," "Fun," "BBQ," "Marshmallow," and "Rock Climbing." The textual search engine 21 makes use of the semantic vector to promote documents that contain terms that strongly correlate with the search term.

Recency is a consideration (see below). As I search, I see more and more things. Some things are kept by people who are not in my immediate social circle, but they indicate somehow that the information is relevant to me, for example based on my profile on KiFi and social networks 27. Unlike the use of "like" in other systems, the Keep is embedded in the search results returned for a Web site. One of the key values is the semantics. Thus, a Keep is unlike, for example, the Facebook "like" because the semantics of a Keep is for myself, not for others, but others may benefit from the fact that I kept a particular page. To indulge in a metaphor: a like is equivalent to one clapping hands, while a Keep is equivalent to: "I'm going to need it, so I'm going to keep it." The later is of significance to others because of the significance it had to me, not because I broadcast my approval for others to see.

Another thing to look at is the point of need, e.g. when you need something. If a friend chooses to like a digital camera and I see it in Facebook, I am not at the point of need when I am going to Facebook. I am just there to catch up with what my friends are up to. I may even look at the camera and go through the page. I probably will not buy it. However, when I am looking at Google and searching for a digital camera, I actually need it now. That is why I search. I actually actively search for this thing. An embodiment of the invention shows me right there and then the thing that is most relevant to me. This is one benefit of using the semantics of a Keep versus a like. This aspect of the invention is referred to herein as a Web gesture.

In this example, it is probably more likely that I would buy the camera when I am searching if I see a Keep of friend that I trust versus if I just see the camera on Facebook at a random page. This points out both the a point of need issue and the trust that I give friends. Each of which is a focus of the invention.

An embodiment of the invention commences with query processing, e.g. a standard search in documents 25. The searcher has a few terms, keywords, and the search engine tries to find them in documents using the search engine 21, and then sorts the documents to attempt to determine which documents are more relevant by clustering and classification 26. In an embodiment of the invention, if other people kept something, then it is relevant; and if I am in the same geolocation as well, then it is probably relevant to me. For example, consider paragliding. If there is a paragliding club next to my location, it may be more relevant to me than something else.

An embodiment of the invention also considers acceleration, i.e. if there is something trendy or recent, it is probably more relevant.

An embodiment of the invention also considers proximity in terms of results that are closer to each other, i.e. they probably relate better. If I'm looking for a dirt bike, the words "dirt" and "bike," if they are in different parts of the document, probably do not mean the same thing as if they are in the same sentence.

An embodiment of the invention also considers socioeconomics. If a person's friends are known to the system, for example via a social network, then knowing a person's friends tells us a lot about that person. Thus, an embodiment of the invention looks at the social network around a person and attempts to identify who they are and what they are probably looking for, for example within the KiFi expert network 24, based upon the activity of the user's connections 30.

An embodiment of the invention also considers behavioral tracking, where the system tracks the behavior of people and tries to account for the behavior with regard to the value a document may have for them. For example, how many times did people click on an article? Did people to interact in their social network, or leave comments? Thus, actions such as clicking, interacting, sharing, and engagement with the page, tells us how the page is important.

An embodiment of the invention also provides comment systems, some of which are private and some of which are public. The Keeps themselves may be private or public. A person may not want to share a Keep, so it is private or anonymized so that other people do not see it.

Personal Semantic Engine

Once the user's information and behavior is studied by the Find Engine, it starts to personalize the search results. Web pages which are kept by the individual or frequently interacted with are promoted.

KiFi personalized search customizes the Semantic Vector. The Semantic Vector of a term may consist of global frequency of related terms. A Personalized Semantic Vector (PSV) uses only a subset of the corpus that is personal to the user to compute a semantic vector. A PSV is computed by taking into account only documents that the user has strong engagement with, and by that we can understand the user's personal semantics when related to a specific term.

For Example:

the term "Camping" discussed previously may be computed into two distinct PSVs for different individuals:

"RV," "Marshmallow," "BBQ," "Yosemite," and "Fun" for the Family Guy; and

"Campground," "Campfire," "Tent," "Woods," "Yosemite," and "Rock Climbing" for the Adventurous Hiker.

As we filter and boost search results using these PSVs, we discover that results for each individual are sorted differently according to that person's personal semantics around the search term. For the Family Guy, Web pages that involve family camping activity are promoted, while the those pages are not prioritized for the Adventurous Hiker.

KiFi Expert Network

The KiFi Expert Network 24 is a layer on top of the KiFi Social Graph. In the KiFi Social Graph, basic connections are viewed as hyper-dimensional relationships based on semantic vectors. The Expert Network locates experts in a user's social graph based on the topic the user inquires about. Because we use the TV of the user, the topic is more than a simple term, and the Expert Network understands the semantics of the terms specifically for that user.

For Example:

when a user inquires about "Camping" we look at what the user intends by "Camping" and we explore who would be the expert among that user's connections 30, in relation to what that user means by "Camping."

Because "Camping" for that user may be related to "RV Style Camping," then his connection that may be an expert about "Rock Climbing Camping" is not an expert for our user. On the other hand, a connection who is an expert on "RV Style Camping" is considered an expert for our user and when he Keeps that content, the content that the connection kept would be recommended to our user.

Because we examine multiple degrees of social connectedness, we can learn about how a specific user is evaluated by his peers. Therefore, with a strong correlation of PSV for a few users, we can cross analyze their relationship and identify the expert among them.

For Example:

Consider a classroom that studies Napoleon Bonaparte. Assuming the students in the class are connected to each other over KiFi, their PSV in relation to Napoleon is similar. After all, they're at the same level of knowledge as they learn together. Therefore, when analyzing the social graph of the users, we can identify the cluster of students in the class with similar PSV as closely related. Going deeper into that cluster of connections we can identify the users who are regarded by their peers as experts by following the networking signals.

In this example, a different person who studies Napoleon for many years and has written numerous academic articles about the topic would not be an expert on the Napoleon topic for this class because he is far too advanced, i.e. he has small relevancy to the high school level class.

As the Find Engine examines potential links to promote to users, it prefers to show the users links that were kept by his connections with stronger preference to the experts in that network.

In an embodiment of the invention, the social network is seen as an expert system. There is the social network in general. Onto that, the invention adds a layer of the strength of connections. Each connection is given some strength. Maybe one person is seen as an expert in artificial intelligence, and another person is an expert in patent law, while still another is an expert in cooking. For example, when the topic being researched is cooking and the expert on artificial intelligence adds Keeps about cooking, the system does not give him as much value as is given to the Keeps of a the person who is an expert on cooking.

Thus, such social connections may have different values, depending on the topic that is being accounting for. The system can take information about, for example, who you are and what value you bring by tracking the behavior and tracking the profile of the people, who they are. Thus, the invention develops a base of semantic knowledge. Embodiments connect through Facebook, LinkedIn, Twitter, etc.

An embodiment of the invention develops a vector, where words surrounding a term are considered. These words are looked at as the context for that term, and this occurrence is used to create a vector. Each term preferably has a vector. Thus, there is preferably a vector for every word in the document. The system also analyzes what a person keeps. Accordingly, the term in one person's Keep has a different vector than that of another person's Keep. Thus, one can have a term with a vector which is tuned for that person's Keeps. All of the documents the person is interested in represent that person's interests, profession etc. Thus, the term "apple" for a computer scientist occurs more in a computer science or computer industry context, but for a farmer it may appear in an agricultural context. By comparing the vector of the document with the searcher's vector, the system can determine if the term "apple" in a document is relevant or not. For purposes of the discussion herein, this is referred to as a semantic vector, the use of which allows the invention to personalize search results.

For further example, the term "banjo" may refer to performance for one person, but it points in a different direction with the search results, i.e. strings. In an embodiment of the invention, when we the search term "banjo" is entered into Google, a vector is applied to it, and the search results are better for what that person is looking because the invention provides a mechanism, i.e. the vector, that recognizes that the term "banjo" has different meanings for different people.

The invention also can use the vector for social purposes because a vector is given to each user. For example, because a vector for one person points toward photography, then that person may be better matched socially with another person having a similar vector, for example, for advising each other, leaving comments, or keeping things and keeping on each other's Keep lists.

For purposes of the discussion herein, it should be appreciated that the term "social" refers to a productive and/or commercial social meaning, rather than a purely relationship-based meaning, where some individuals know, for example, about plumbing, some individuals know about how to set up roofs, etc. Social herein is used in the sense of society.

Another embodiment of the invention concerns expert systems which create a social graph and links between people based on terms or classifications. An embodiment of the invention takes classifications as semantic vectors, but it could be any classification, and applies values on the classifications and links between people.

In this regard, it should be considered that, over time, a person's vector can shift. For example, the person can progress from an amateur banjo player to an virtuoso. This concept also applies to the expert system. One may think that their friend here is an expert, e.g. in banjos, but my friend has gotten better or worse. The relationship between people changes over time and an embodiment of the invention tracks and applies this change on the social graph in the expert system. This aspect of the invention is dynamic and adaptive. The system gathers the activities from the social network that a person is part of, i.e. the behavior of the people in the social network, and applies the resulting information to the system.

Instead of a bookmark tool, which pulls down a bookmark, an embodiment of the invention provides a tool that comes down to each person's Keeps. One can enter comments with the tool for each Keep, such that the Keep is a carrier for additional information, e.g. meta-information, and this meta-information is dynamic because people can add to it.

Additionally, the invention provides a self-organizing discussion group because if someone is keeping something and there are other people who are keeping the same thing, then a whole discussion goes on around this one thing.

Furthermore, the invention provides a way to organize my bookmarks relative to searches. People capture bookmarks and never use them. With the invention, if something is found to be interesting it can be saved as a Keep. If a new search is performed a few weeks later and the page that I kept comes up again it is promoted in the search results. Thus, the invention provides a way of bringing a page of interest back to one's attention. Accordingly, one aspect of a keep is to provide a persistent search object to which metadata may be attached.

There are two aspects to expert ratings. There is a global rating as an expert, which is the average of all the different ratings given an individual by others in all of the individual's capacities. For example, the individual in question may rate highly as a scientist and poorly as a cook. There is also a local rating. For example, if I am a scientist and my friend is a cook, then my rating as a scientist for my friend is high, but my rating for my friend as a cook is low. This rating can be derived from the overall rating given by others, but also by seeing what the individual keeps more of and less of. As a result, the rating of an individual can start to drift. If the individual keeps everything, a lower rating may be increased because that individual has many demonstrated interests; if the individual never keeps anything, a lower rating may be applied because the individual have not demonstrated any interests that would indicate any areas of expertise. In the invention, the learning mechanism is the use of Keeps.

Keeps are not bookmarks and can be derived from a person's profile on Facebook, LinkedIn, etc. Keeps can be what a person liked, the type of interactions a person has with a particular Web page, a page a person comments on and/or spends a lot of time on, etc. Broadly, a Keep comprises the behavior one has with the data in the system and/or who one is personally.

the KiFi Slider is a Lot More than Just a Keep it Button

Figure 3:
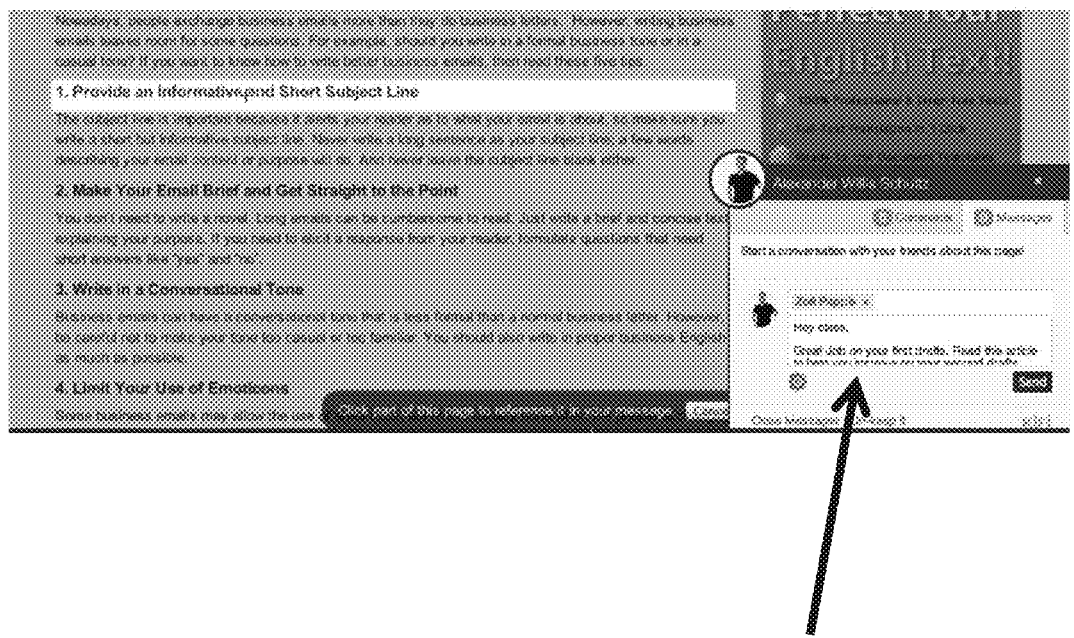
FIG. 3 is a screenshot showing a user interface that includes a slider according to the invention.

The KiFi Slider 31 (see FIG. 3, and discussed in greater detail below) can conveniently appear or be opened on every page while you browse the Web. The slider is equipped with features designed to help easily keep and share documents, messages, ideas, notes with our friends and the world.

The KiFi slider uses a smart algorithm called "The Slider Logic" (discussed below) that lets the slider open and suggest when to keep and even what you should or shouldn't keep. Moreover, the Slider is equipped with communication tools.

- The messages feature allows us to easily send links and message to a friend privately; and
- The comments feature allows us to leave a review, comment or ask a question publically, and also post them on our social networks.

Everyone is a Contributor—the KiFi Social Networking Website

KiFi is a social networking Website intended to connect friends, family, and associates to easily find, discover, and manage Keeps.

To understand KiFi's value, let's use the analogy of Amish home-building. Perhaps you've heard of how the Amish people come together as a community and use their combined individual levels of expertise to build a new house. They can do this in a matter of days because everyone is a contributor. In fact, every individual in the community adds value and expertise in several ways. The mailman might be the one to install the plumbing and the windows, the school teacher might paint the walls and install the roof, while the carpenter also might do the landscaping and prepare the food.

Likewise, your social network is filled with experts in many things. KiFi facilitates your existing social networks, e.g. Facebook, Google+, etc., to help you discover what you're looking for, even if it's difficult to search for. On KiFi, users keep information that is important to them. This action is fundamentally different than likes, because your experts don't publish everything valuable to them on Facebook. What you keep on KiFi reveals so many dimensions of your expertise.

For Example:

Facebook only shows around 15-20% of the actual content all of your friends publish. Let's say that your friend Peter works at a restaurant, but he also knows a lot about hiking trails nearby. Unfortunately, because Peter doesn't publicly share all of his passions online, he can't easily help you. In fact, you might not even know all of what Peter is an expert in. Your Facebook friendship merely represents what each of you publish, and that's if you even get to see it. This ends up being very one-dimensional.

However, when your friends keep what is important to them, the KiFi engine connects you to their expertise. For your upcoming hiking trip, you see that Paul kept a local trail that you didn't know about. Now, you can find real value in your social network connections. In fact, KiFi doesn't limit who can help you to your most inner social network. Kifi lets you benefit from all the expertise of your friends. KiFi turns your social network (connections) into a helpful network (expert network). Everyone adds value.

The 90/9/1 Rule

When thinking about how KiFi can transform a social network in an Expert Network, consider the 90/9/1 Rule. Simply put, studies have shown that in Internet communities 90% of users lurk, 9% of users contribute, through simple actions such as reply, like, and voting, and only 1% of users create. Yet when you flip that number, 90% of the content comes from 1% of the users, 10% comes from 9% of users, and the remaining 89% of users contribute nothing.

Kifi turns this dynamic on its head. Everyone is a contributor. All of your friends can help you, by simply using Kifi for themselves, because they want to be able to keep things and easily find them later.

- Contributing is simple and easy. It keeps the same habit loops that we already have when we bookmark.
- Contributing is merely a side effect of keeping what is important to you. Kifi serves you first, helping you easily find what you found before.
- KiFi rewards you. As you keep, you help your friends, which brings you true social value. Imagine: What if you were able to help your friends with things that you are passionate about, without lifting a finger? How would you feel knowing you constantly help your friends?
- Quality > Quantity. KiFi doesn't flood you with millions of results. We show you what's valuable to you now: your previous valuable links and your expert friends' links.

Help Rank

Help Rank is an algorithm designed to rank the KiFi results based on how helpful they are for each user.

The Help Rank algorithm is based on:

Your Keeps;

Rekeeps by friends/connections;

Social relationships:

- How close you are with others based on your social graphs,
- How much you have in common with others based on mutual interest, Recency, and Online behavior: clicks, history, Keeps; and Semantic vector.

Help Rank helps in new way. As opposed to Search Engine Optimization, which evaluates one universal set of what is the best information, i.e. Wikipedia as the default, and often unhelpful, first search result, Help Rank is unique to each KiFi user's values. The herein described algorithm gets you much closer to what you're actually trying to find. This is because Help Rank is dynamic: what's #1 in the search results for me won't be #1 for you.

If the most important thing about a search engine is how things are ranked, imagine the power of a search engine that ranks with your values in mind.

The invention can be thought of as a find engine that is intertwined into any search engine, such as Google, Bing, Ask, Pinterest, Amazon, etc. Finding is very important because it is not just finding the item or the document. It is not just finding a link or finding something technical. Finding concerns the relationship of those who keep information and those who can then find the information.

Today, people are experts in many things throughout one day. This aspect of each individual, as tracked for example by their Keeps, all goes into the find engine. However, finding a document is still not enough. A search in Google can find the right result because the result makes sense for the query. As discussed above, the invention provides the individual with the option to keep search results. A further aspect of the invention is referred to as help rank, where an individual keeps a site that was found through a friend because the friend had a Keep for that information.

Keeps can include comments and messages. For example, an individual keeps information about a camera on Amazon and comments as follows, "The best camera I ever bought." Then, the comment is further validation of the relevance of the search result. Likewise, messages allow one to write a message to a person who had a keep for, e.g. a camera, which he gets in his email, Facebook etc., which asks him, "Hey, did you buy this thing that you kept?"

The invention applies a technique that recognizes that each person is an expert in many, many things, and that each person is interested in many, many things. The use of Keeps informs both the individual who made a Keep when that individual performs a further search and informs a community of individuals by sharing that person's expertise and research with all other individuals who are looking to find similar information and, at the same time builds an expert network or both known individuals, such as friends, and third parties, who are related by a common interest. In such network, each person shares their expertise by what they keep.

Thus, you browse the Internet. You find the best information. You keep it. You comment on it. You micro-mark things in it. For me, in two seconds I find all of the answers that I want just by looking for it because of your Keeps and those of others. This is not possible in a typical search engine.

In this example, some Keeps are from my friend. His results may be lower in rank because of his level of expertise. Help rank further refines the search results by promoting results based upon the Keeps not only of friends, but also of others, some of whom are highly rated experts with regard to the topic in which I am interested. For example, consider an MIT professor who wrote a document about how to purify water using home appliances. The professor posts the document on his blog. But who reads his blog? Not many people. If I search on Google, I probably cannot easily find the professor's blog because of the way Google page rank works, where one of the parameters that is used to rank results concerns how many Web sites point to the professor's blog. Page rank optimizes for popularity, not necessarily relevance. Google also looks at information known about the searcher, for example from Google Plus, and maybe searches that the searcher made, clicks in the search engine, etc. In this example, the MIT professor posted on his blog. In connection with the invention, a student of the professor looks at the professor's blog. He is perhaps one of 20-100 people who look at this blog. And the student keeps it because it is important to him. And then, on the student's network, two other people found the professor's blog and they also kept it, and on and on. In connection with this example, further consider a student in Zimbabwe. His water is horrible. Full of disease. But he has the Internet on his phone and he gets to the professor's article because people kept it. And for him, his three best friends kept it. So, it was socially validated by them and then by all those people all the way back to the MIT professor. The student in Zimbabwe would never find the professor's article on Google because it would have a very low ranking result number. Because the article was validated and promoted by the Keeps of others it was lifted out of the noise and brought into a deserved position of prominence in the search results.

Thus, the help rank feature of the invention takes advantage of people keeping things by using the Keep feature of the invention. By keeping information, people help each other. In an embodiment of the invention, the system finds a common value, which can be a visualization of the expert network. This is the social network and, on top of that, there is the expert network, which is another form of social network. Thus, the expert network is the network between people and how they are related to each other in terms of expertise. It is a data-mined or filtered social network because the connections between people are based upon the expertise that they share and the resonance of people regarding that expertise. The finding aspect of the social network is dynamic to that relationship, where that relationship changes over time. For example, a friend may have expertise or interests in cooking, which may promote their keeps on this topic and which may rank them highly as an expert resource on this topic. Then my friend went to school to learn about patents. Suddenly, the circles change and my friend's expertise in patents grows because he went to school, and this is reflected in his keeps because he started keeping about patents. Thus, his relationship with me changes. Accordingly, there are circles of expertise within a social network.

Distribution and Revenue

Distribution

Viral Channels:

KiFi is highly flexible in its ability to operate on any number of viral channels:

Keeping—what you Keep can also be posted on any social network.

Commenting—when you Comment, this info can be posted on any social network.

Messaging—not only can one Message within the KiFi Slider, but the function can be used to send links to people who don't have KiFi. When recipients would like to engage with the message, they would have to register for KiFi.

Invite Friends Channels:

KiFi offers an array of simple, immediate channels to easily invite friend networks:

Word of Mouth—KiFi results are better for you the more friends/connection you add, and so word of mouth is accelerated by the site's efficacy for individual users.

Additionally, the more friends you have, the more data you're exposed to, and thus more social validation you have.

Connection to any Social Network and importing your friends. KiFi makes it simple to import from Facebook, Google+, LinkedIn, and more.

Connecting to your Contacts and importing your friends. It's also easy to access the records we keep with email lists, phone numbers, and digital address books.

Importing a contact pings a friend, thus prompting an opt in, to invite him into the system.

Viral Channel for Partnerships:

Adding a Keep It button on a business homepage offers a significant viral channel for partners. Business partners are able to see quickly the difference between how SEO ranks their Webpage versus KiFi. When sites distribute KiFi to their users, they come up as the top result in any search asset when someone Keeps their page. In addition, all the friends of that KiFi user see the site Kept and validated when they search for the partner site.

User Interface

FIGS. 4-15 are screen shots that depict various aspects of the KiFi user interface.

Figure 4:
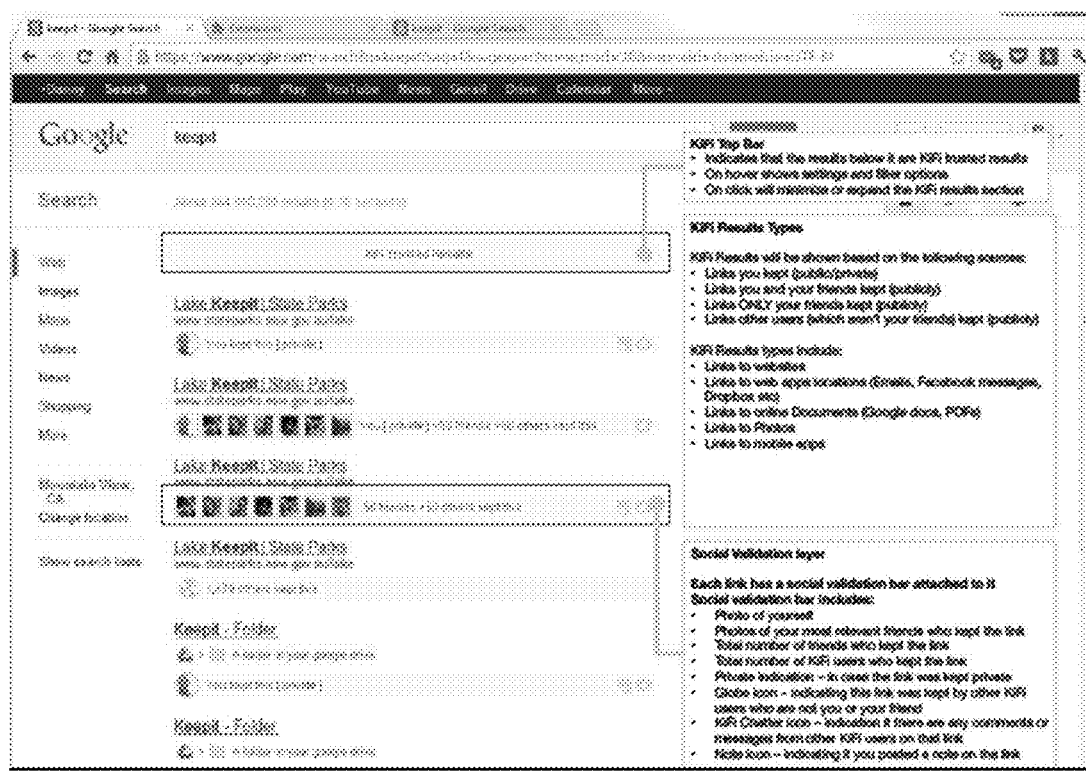
FIG. 4 is a screen shot showing an overall view of a user interface according to the invention.
Figure 5:
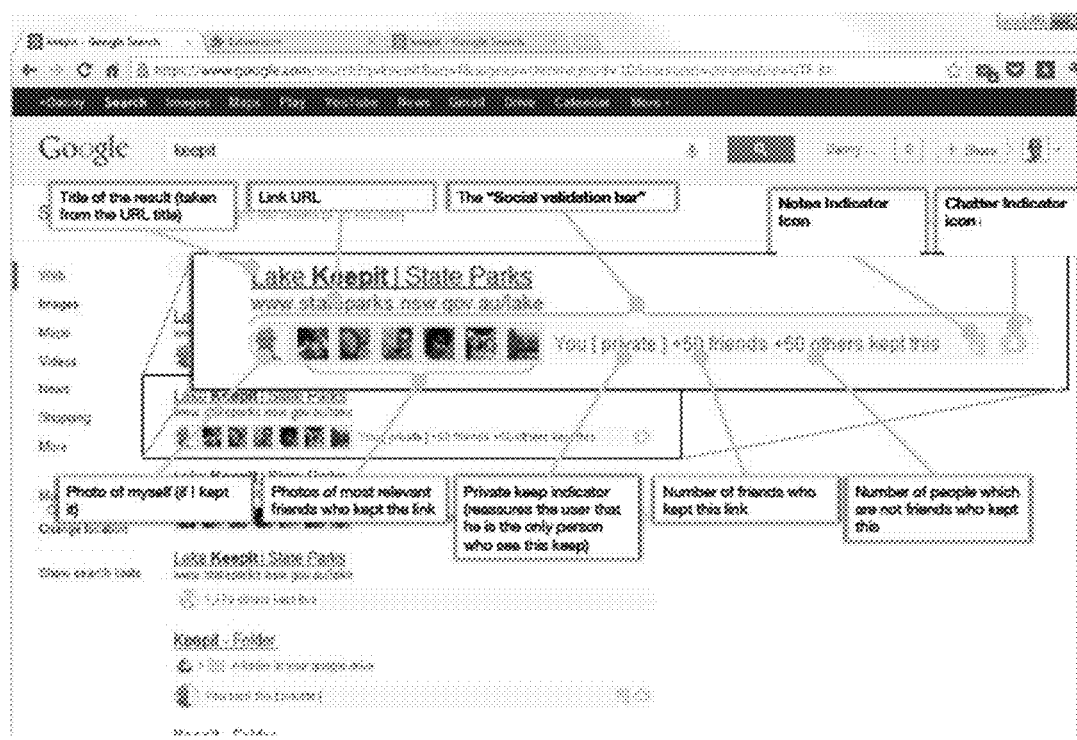
FIG. 5 is a screen shot showing a detailed view of a results and social validation bar according to the invention.

FIG. 4 provides a general understanding of a KiFi search. In FIG. 4, there is the KiFi Top Bar, which:

Indicates that the results below it are KiFi trusted results
On hover shows settings and filter options
On click minimizes or expands the KiFi results section;
The KiFi Results Types, where KiFi Results will be shown based on the following sources:
  Links you kept (public/private)
  Links you and your friends kept (publicly)
  Links ONLY your friends kept (publicly)
  Links other users (which aren't your friends) kept (publicly)
KiFi Results types include:
  Links to websites
  Links to web apps locations, e.g. emails, Facebook messages, Dropbox etc.
  Links to online Documents, e.g. Google docs, PDFs
  Links to Photos
  Links to mobile apps; and
The Social Validation layer, where each link has a social validation bar attached to it, and where the social validation bar includes:
  Photo of yourself
  Photos of your most relevant friends who kept the link
  Total number of friends who kept the link
  Total number of KiFi users who kept the link
  Private indication in case the link was kept private
  Globe icon, indicating this link was kept by other KiFi users who are not you or your friend
  KiFi Chatter icon, indicating if there are any comments or messages from other KiFi users on that link
  Note icon, indicating if you posted a note on the link FIG. 5 provides a detailed view of the KiFi results and social validation bar. FIG. 5 includes: Title of the result (taken from the URL title); Link URL; The Social validation bar; Chatter Indicator icon (more details below); Photo of myself (if I kept it); Photos of most relevant friends who kept the link; Private Keep indicator, which reassures the user that he is the only person who see this Keep; Number of friends who kept this link; and Number of people which are not friends who kept this.

Figure 6:
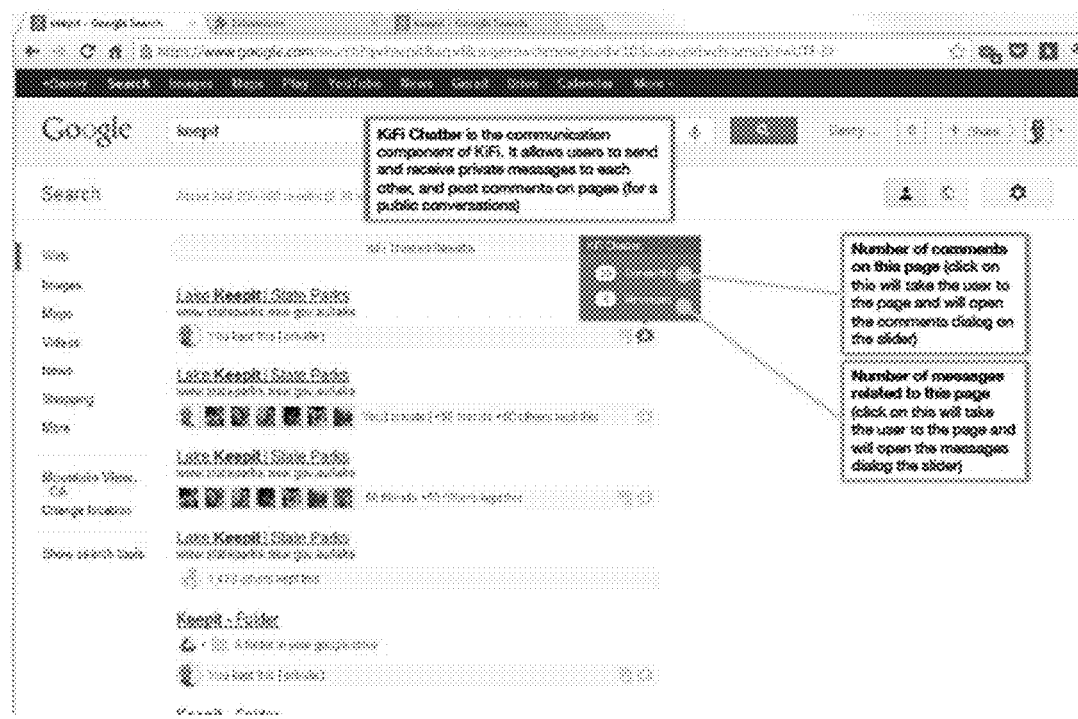
FIG. 6 is a screen shot showing a chatter tooltip according to the invention.

FIG. 6 shows the KiFi Chatter Tooltip, which appears on the social validation bar only in case that any comments or messages were added on that page:

KiFi Chatter is the communication component of KiFi. It allows users to send and receive private messages to each other, and post comments on pages for a public conversations;

Number of comments on this page, i.e. a click on this takes the user to the page and opens the comments dialog on the slider; and Number of messages related to this page, i.e. a click on this takes the user to the page and opens the messages dialog the slider.

Figure 7:
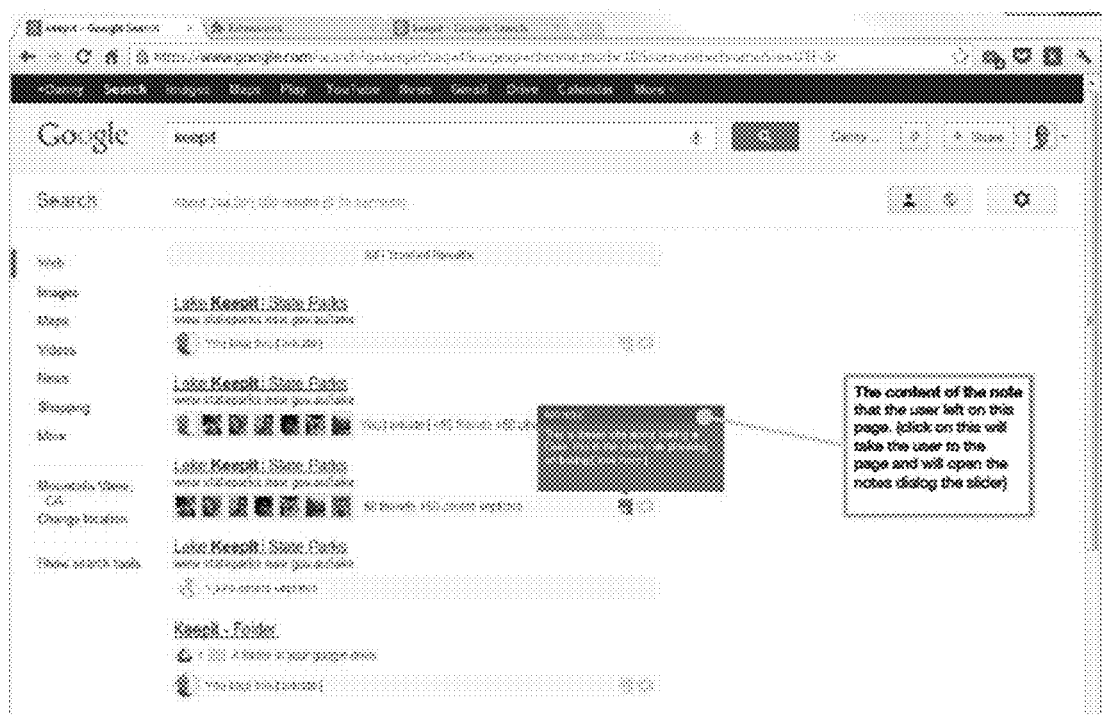
FIG. 7 is a screen shot showing a note tooltip according to the invention.

FIG. 7 shows a KiFi Note Tooltip, which appears only if the user left a note on this page:

The content of the note that the user left on this page, i.e. a click on this takes the user to the page and opens the notes dialog the slider.

Figure 8:
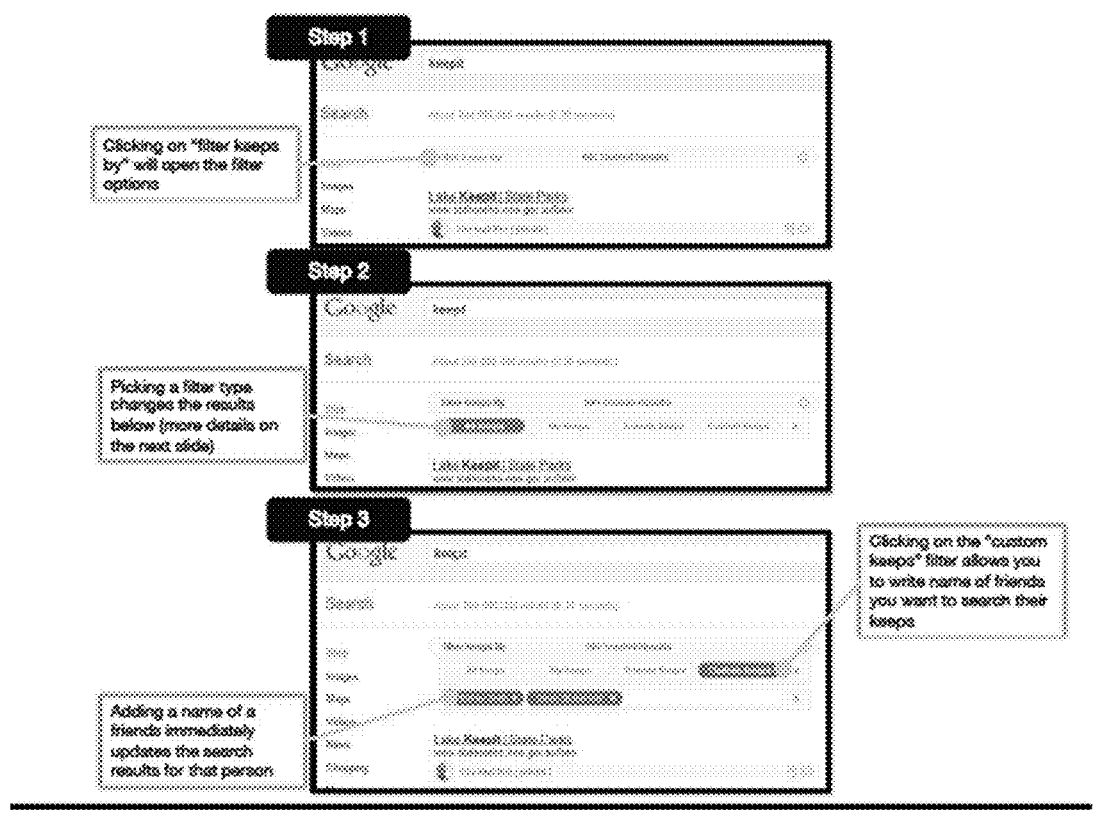
FIG. 8 is a screen shot showing a top bar according to the invention.

FIG. 8 shows The KiFi Top Bar, which allows the user to enable filters to refine and improve his search. The KiFi Top Bar:

Step 1: The top bar allows the user to enable filters to refine and improve his search;

Step 2: Picking a filter type changes the results below (more details on the next slide);

Step 3: Clicking on the "custom keeps" filter allows you to write name of friends you whose keeps you want to search; and Adding a name of a friend immediately updates the search results for that person.

Figure 9:
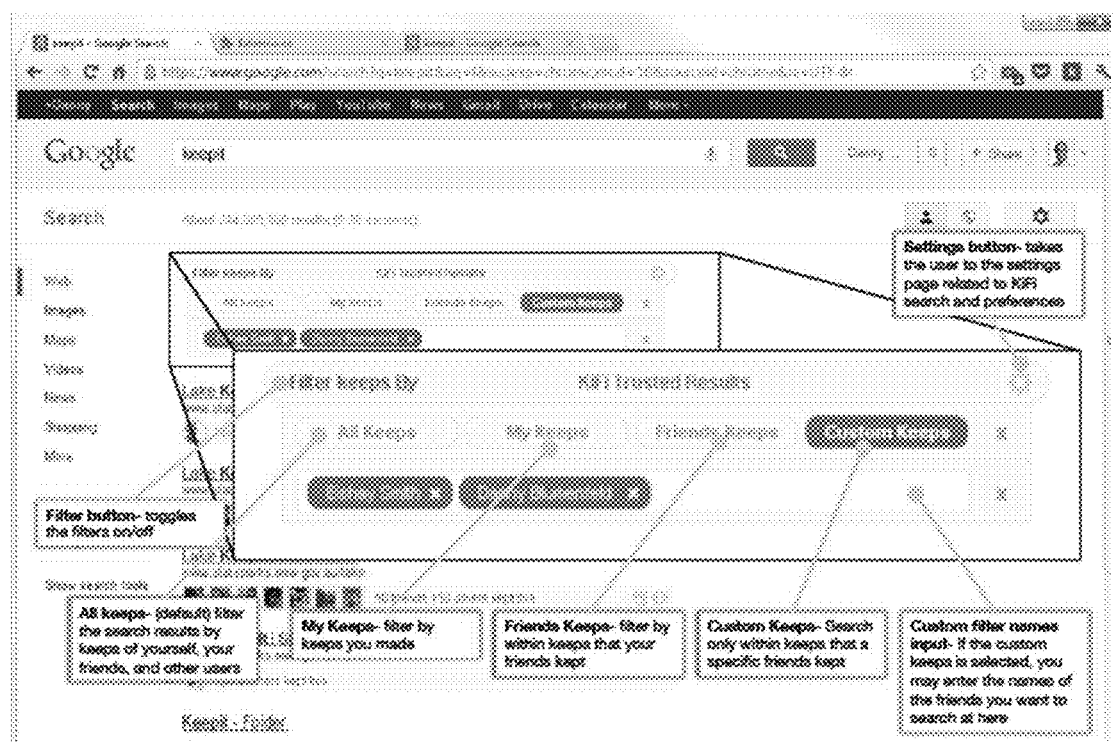
FIG. 9 is a screen shot showing a top bar flow according to the invention.

FIG. 9 shows The KiFi Top Bar flow, which allows the user to enable filters to refine and improve his search. The Settings button takes the user to the settings page related to KiFi search and preferences; My Keeps filters by Keeps you made; Friends Keeps filters by Keeps that your friends kept; and Custom Keeps searches only within Keeps that specific friends kept.

Figure 10:
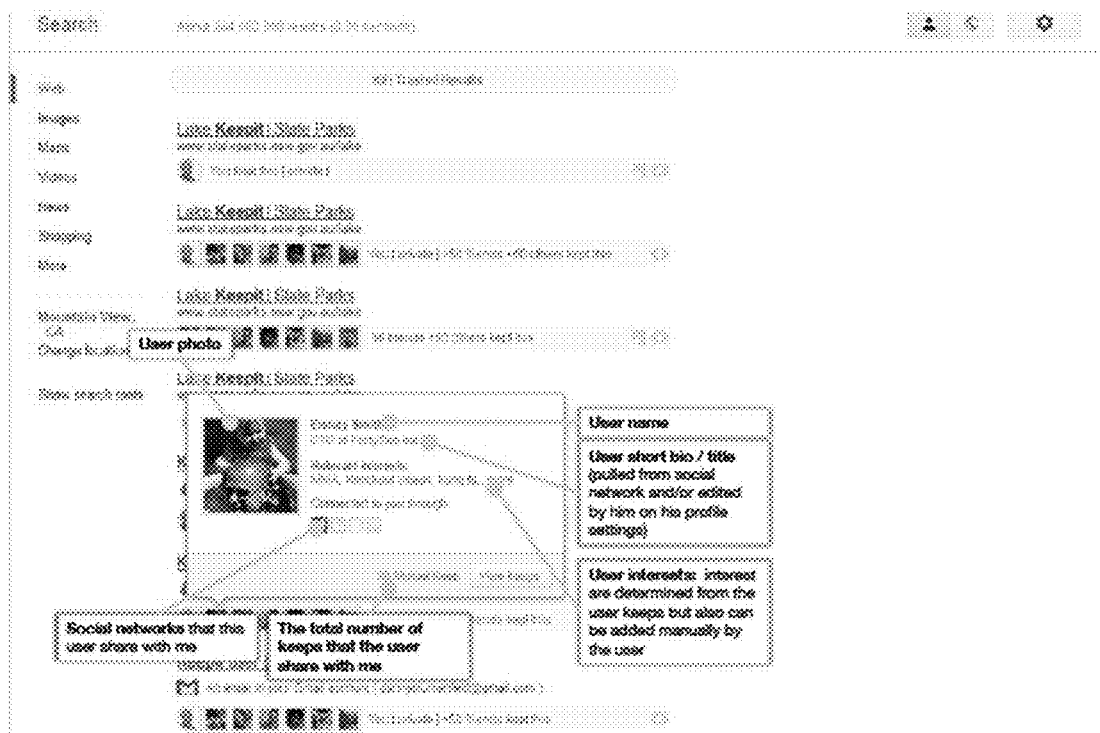
FIG. 10 is a screen shot showing a user tooltip according to the invention.

FIG. 10 shows the KiFi User ToolTip, which appears when you hover over the photo of a specific user. This includes: User name; User short bio/title, e.g. pulled from social network and/or edited by him on his profile settings; User interests, e.g. interests determined from the user Keeps but also can be added manually by the user; Social networks that this user shares with me; and The total number of Keeps that the user shares with me.

Figure 11:
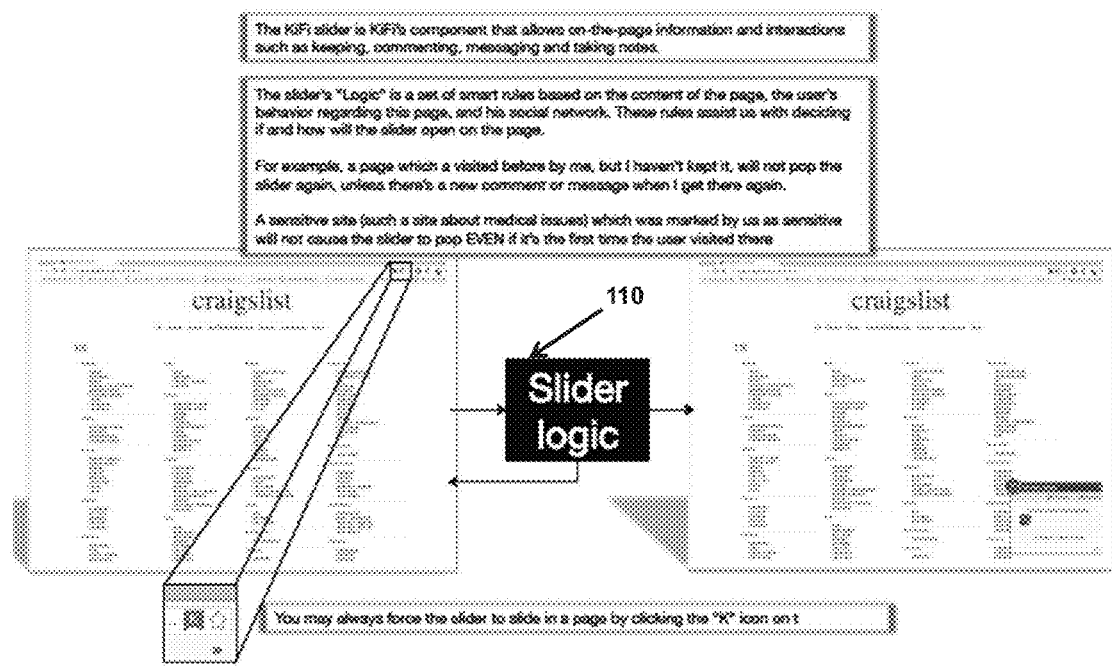
FIG. 11 is a screen shot showing the slider concept and logic according to the invention.

FIG. 11 shows the KiFi Slider concept and logic. The KiFi slider is KiFi's component that allows on-the-page information and interactions such as keeping, commenting, messaging, and taking notes. The slider's Logic 110 is a set of smart rules based on the content of the page, the user's behavior regarding this page, and his social network. These rules assist us with deciding if and how the slider opens on the page.

For example, a page which a visited before by me, but I haven't kept it, does not pop the slider again, unless there's a new comment or message when I get there again.

A sensitive site, such a site about medical issues, which was marked by us as sensitive does not cause the slider to pop even if it's the first time the user visited there. You may always force the slider to slide in a page by clicking the "K" icon on it.

Figure 12:
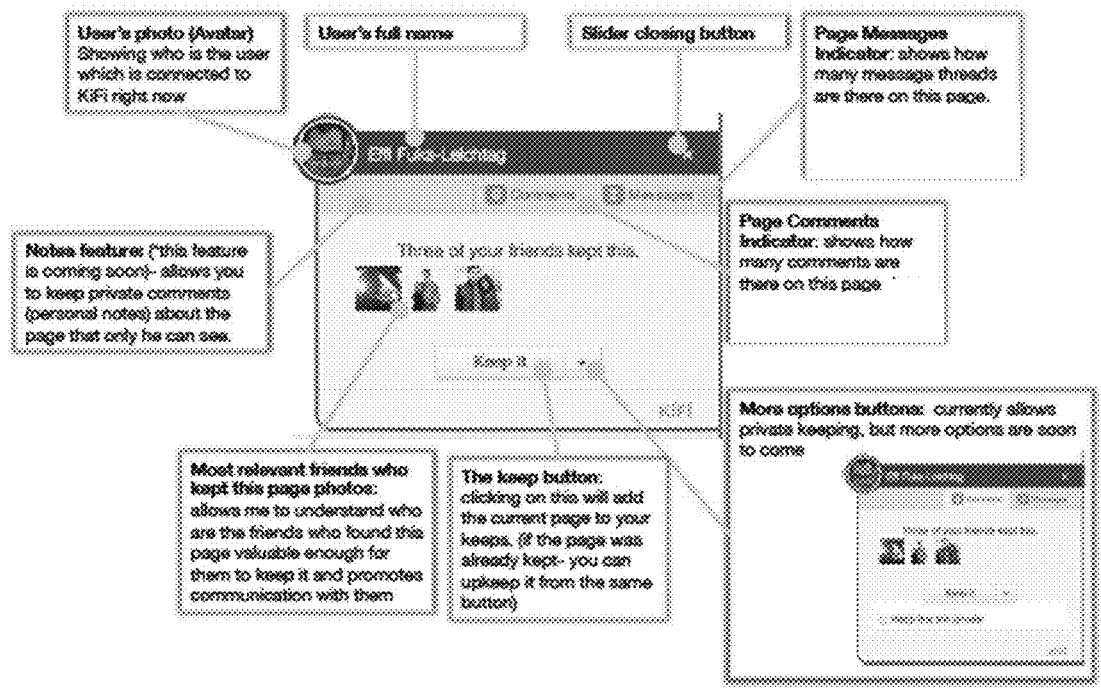
FIG. 12 is a screen shot showing the basic anatomy of the slider according to the invention.

FIG. 12 shows the "KiFi Slider" basic anatomy. This includes: User's photo (Avatar) showing the user who is connected to KiFi right now; User's full name; Slider closing button; Page Messages Indicator, which shows how many message threads are there on this page (see messages interaction discussed elsewhere herein); Page Comments Indicator, which shows how many comments are there on this page. (see comments interaction discussed elsewhere herein); Notes feature, which allows you to keep private comments, e.g. personal notes, about the page that only he can see; Most relevant friends who kept this page photos, which allows me to understand who are the friends who found this page valuable enough for them to keep it and promotes communication with them; The keep button, clicking on this adds the current page to your keeps, and if the page was already kept, you can unkeep it from the same button; and The keep button, clicking on this adds the current page to your keeps, and if the page was already kept, you can unkeep it from the same button.

Figure 13:
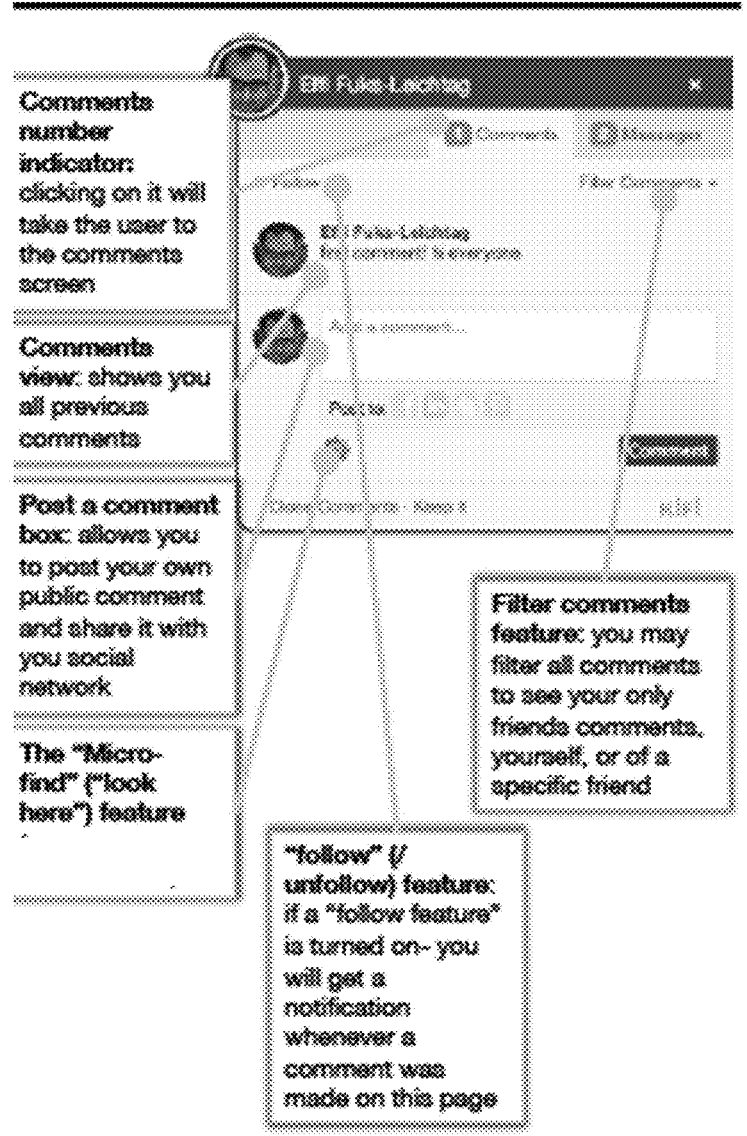
FIG. 13 is a screen shot showing comments flow according to the invention.

FIG. 13 shows Comments flow, including: Comments number indicator, where clicking on it takes the user to the comments screen; Comments view, which shows you all previous comments; Post a comment box, which allows you to post your own public comment and share it with you social network; The "Micro-find" ("look here") feature (see more discussed elsewhere herein); Filter comments feature, with which you may filter all comments to see your only friends comments, yourself, or of a specific friend; and "follow" (/unfollow) feature, where if a "follow feature" is turned on, you get a notification whenever a comment was made on this page.

Figure 14:
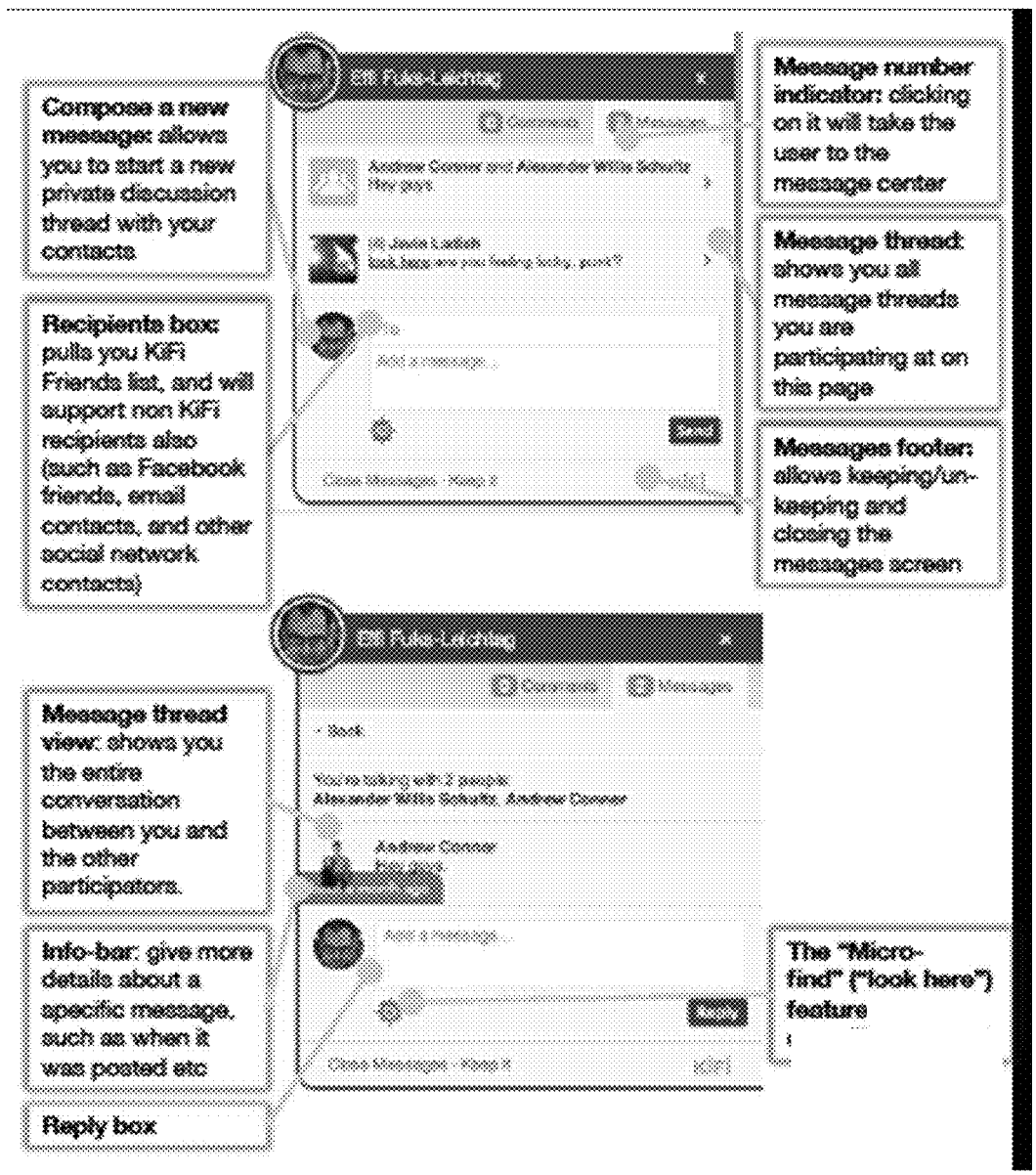
FIG. 14 is a screen shot showing messages flow according to the invention.

FIG. 14 shows Messages flow, including: Compose a new message, which allows you to start a new private discussion thread with your contacts; Recipients box, which pulls your KiFi Friends list, and supports non-KiFi recipients also, such as Facebook friends, email contacts, and other social network contacts; Message thread view, which shows you the entire conversation between you and the other participators; Infobar, which gives more details about a specific message, such as when it was posted, etc.; Reply box; Message number indicator, wherein clicking on it takes the user to the message center; Message thread, which shows you all message threads you are participating at on this page; Messages footer, which allows keeping/un-keeping and closing the messages screen; and The "Micro-find" ("look here") feature (see more discussed elsewhere herein).

Figure 15:
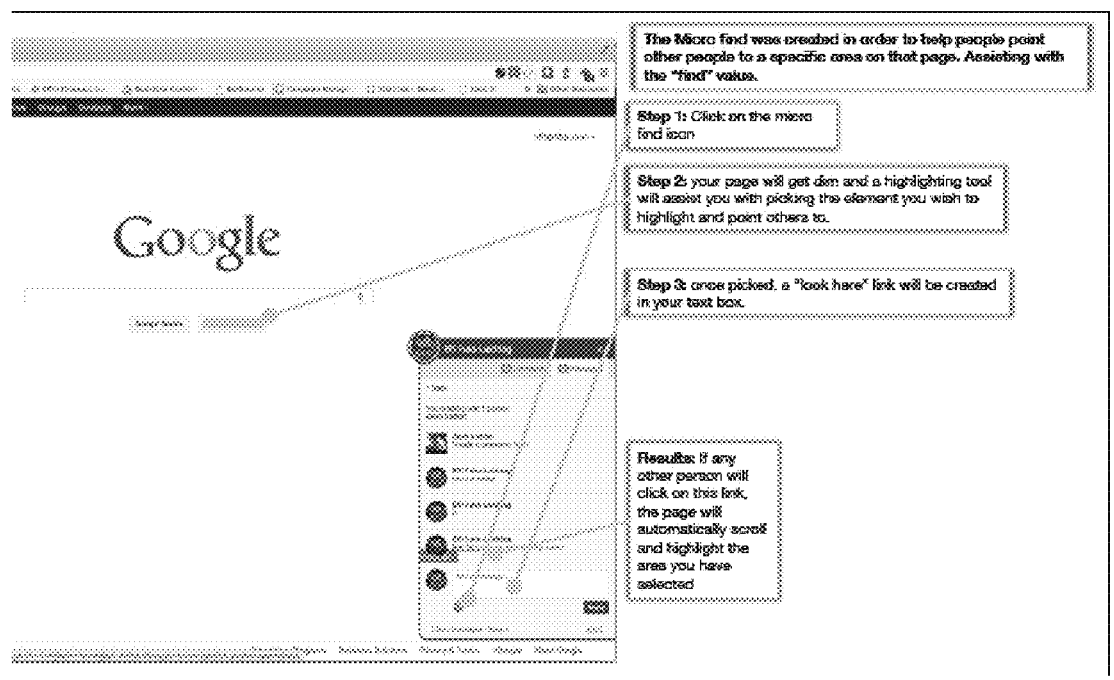
FIG. 15 is a screen shot showing a micro-find feature according to the invention.

FIG. 15 shows The "Micro-find" ("look here") feature (see more discussed elsewhere herein). The Micro find was created to help people point other people to a specific area on that page. Assisting with the "find" value.

Step 1: Click on the micro find icon;

Step 2: Your page gets dim and a highlighting tool assists you with picking the element you wish to highlight and point others to;

Step 3: Once picked, a "look here" link is created in your text box.

Results: If any other person clicks on this link, the page automatically scrolls and highlights the area you have selected.

Architecture

Figure 16:
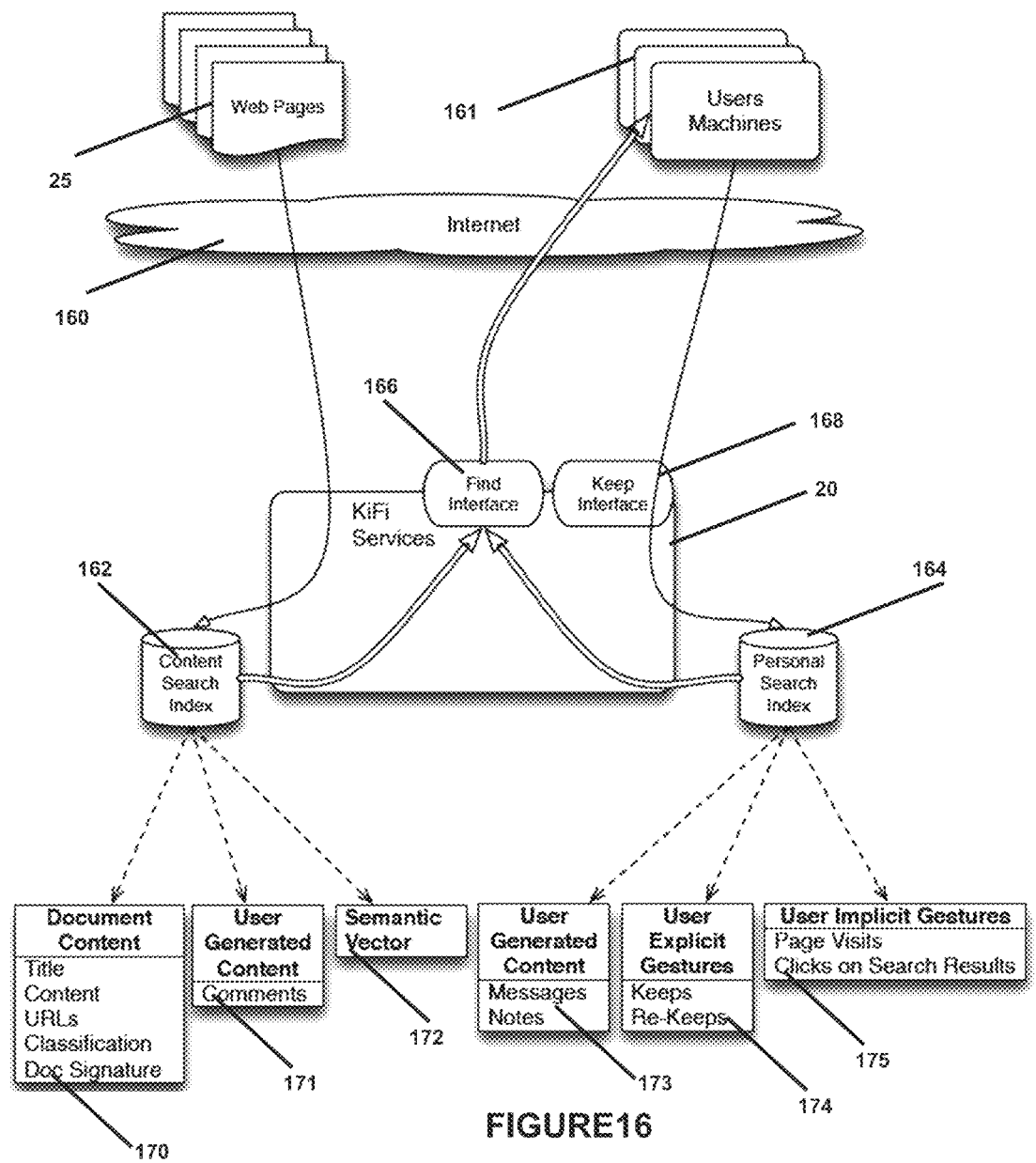
FIG. 16 is a block schematic diagram of a system architecture according to the invention.

FIG. 16 is a block schematic diagram of a system architecture according to the invention. In FIG. 16, KiFi services, e.g. the Find Engine 20, provide a Find interface 166 and a Keep interface 168. In the presently preferred embodiment of the invention, system users 161 access the Find and Keep interfaces via the Internet 160, although the invention may be used in connection with other networks. The Find interface is used to access a content search index 162 and a personal search index 164, while the Keep interface accesses the personal search index. The content search index lists Web pages document content 170, user generated content 171, and semantic vectors 172 (described elsewhere); the personal search index lists user generated content 173, user explicit gestures 174, and user implicit gestures 175.

FIG. 17 is an example of the results returned in response to a search query according to the invention. In FIG. 17, the user has searched on the query "apple" and the search has returned four results, three of which are related to Apple Inc.

Figure 18:
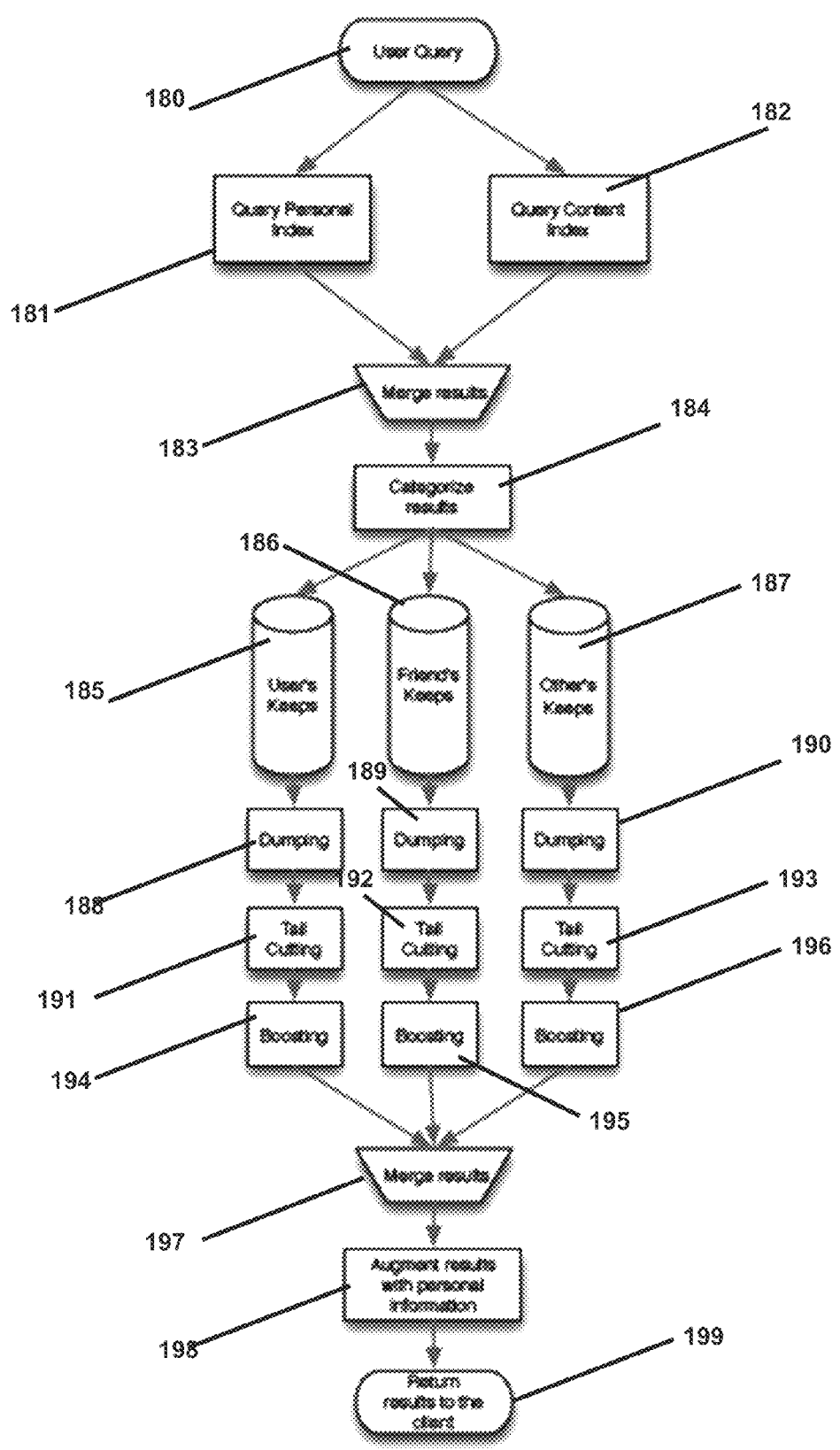
FIG. 18 is a flow diagram showing a user search mechanism according to the invention.

FIG. 18 is a flow diagram showing a user search mechanism according to the invention. First, a user posits a query to the inventive system (180). The query is not incorporated with, for example, a Google search, but the system may include results that were previously obtained, for example from a Google search. An embodiment of the invention provides two indices, as shown on FIG. 16: an index for personal content and an index for general content. General content refers to a document itself. Personal content refers to the user's notes, comments, and any other meta-data that the user has personally related to the document.

The search is performed on these two indices (181; 182) and the results are merged (183). For example, there may be a document that does not have the word "elephant" in it, but there is a comment that the user attached to the document that does contain the word "elephant." In this case, the system retrieves that document as well. The user comment about "elephants" is in the personal index; the content index returns documents with the word "elephant." The indices themselves may be any convenient data structure, such as a table; further, embodiments of the invention can use more than two indices.

As noted, the system merges the results and then categorizes (184) the results into a plurality of categories which, in this embodiment comprise three sets of results, i.e. what the user kept (185), what the user's friends kept (186), and what others kept (187). For each of these categories the system processes the corresponding results in a series of stages that begins with dumping (189, 190, 191) some of the results. Dumping can be thought of as demoting some of the scores. Next, tail-cutting (191, 192, 193) is used to decide upfront which of the results are not relevant. Then some of the results are boosted (194, 195, 196) based on other characteristics, for example number of Keeps they had or some time recency, e.g. a recency boost. Those skilled in the art will appreciate that each stage, for example, boosting can apply any of a number of parameters. For example, boosting can concern six, seven, or more different parameters.

At the end of this series of processing stages, the system merges the results (197). The results are then augmented with personal information about the user (198), e.g. from a user profile, and the results are then returned to the client (199). In the example of FIG. 17, the results shown where produced according to the steps shown in FIG. 18.

Figure 19:
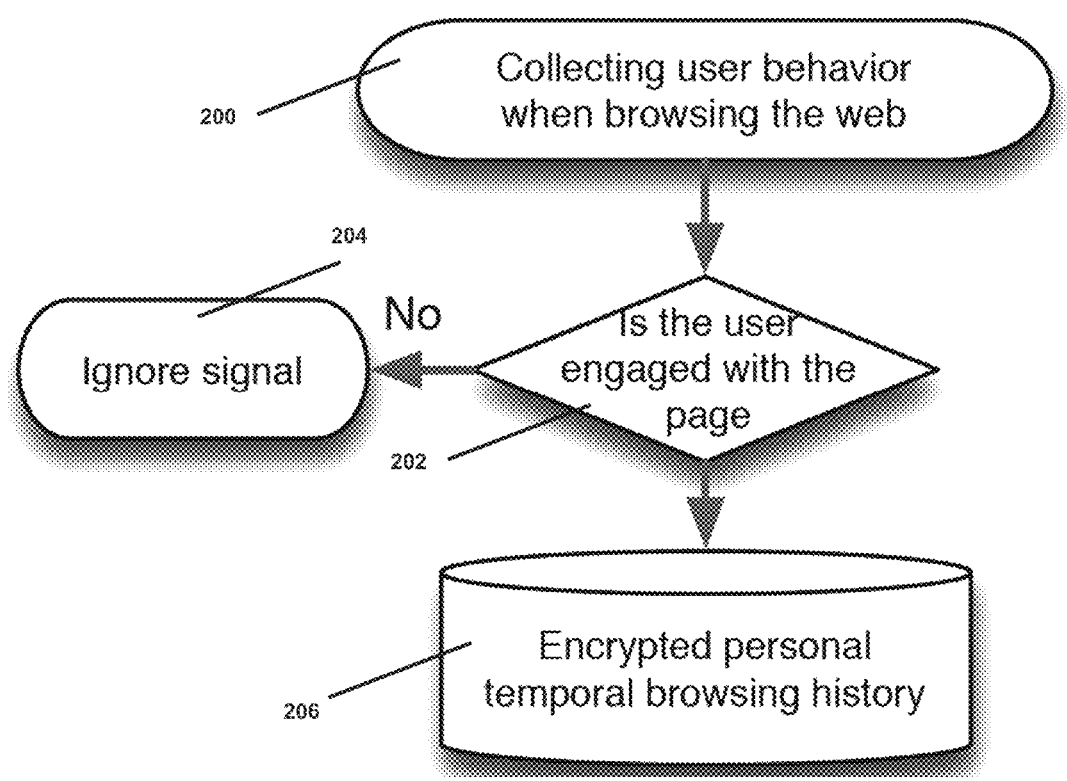
FIG. 19 is a flow diagram that shows user interaction with search results according to the invention.
Figure 20:
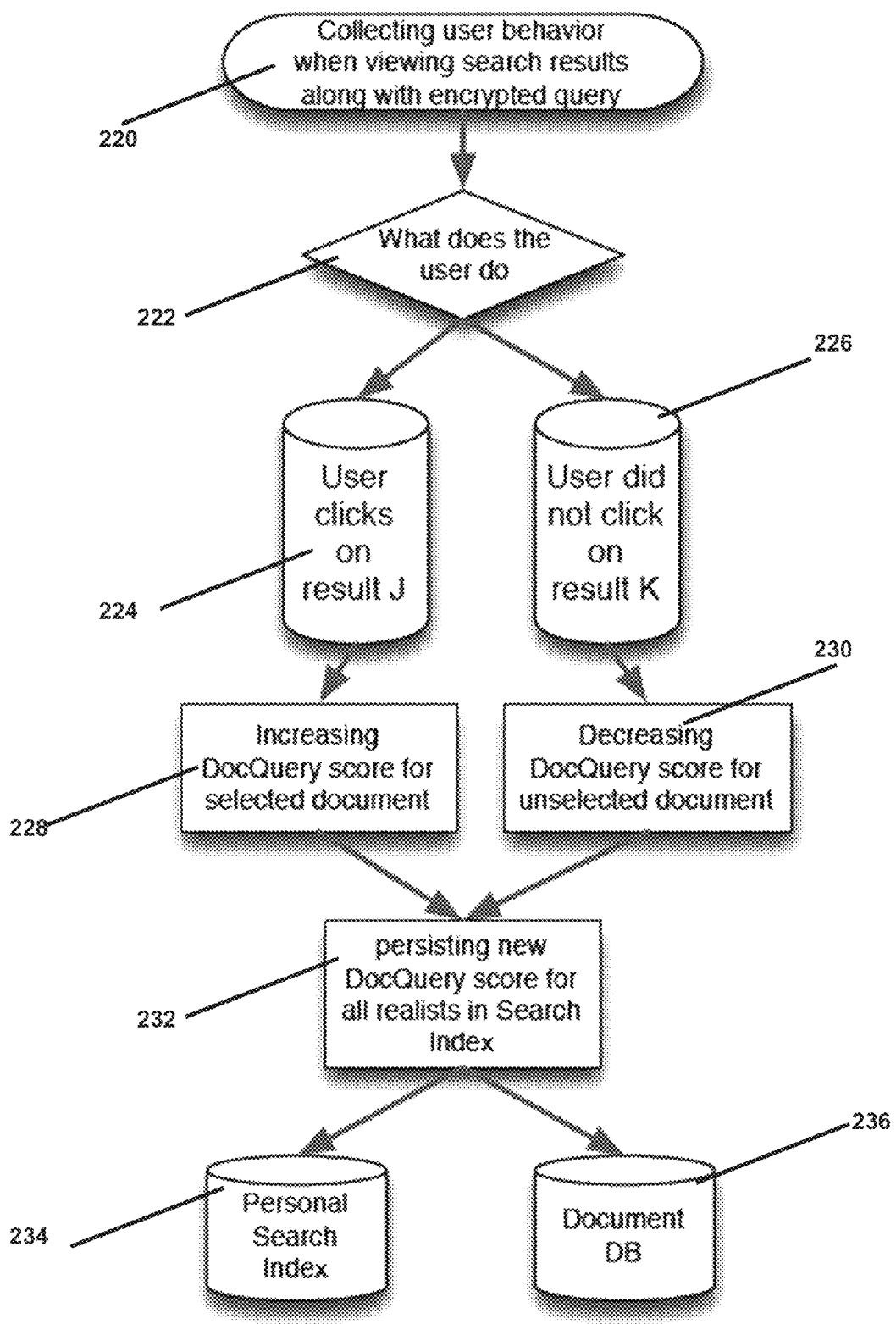
FIG. 20 is a detailed flow diagram showing system processing of search results in connection with user behavior according to the invention.

FIG. 19 is a flow diagram that shows user interaction with search results according to the invention, and FIG. 20 is a detailed flow diagram showing system processing of search results in connection with user behavior according to the invention. For example, in an embodiment the system boosts and dumps results on the basis of user interaction with the results. It is preferred to amplify the results that have a high interaction and to dump the results that are consistently not helpful. Even though the latter results may have high value algorithmically, the user insists on not using them, so they are dumped. This aspect of the invention goes to the idea that the same word could mean different things to different people.

Thus, as shown in FIG. 17 for "apple" there is Apple Inc., picking apples, the Apple ID account, and the Apple stock. The system collects user behavior when the user views the search results (200; FIG. 19), along with the encrypted query. For example, is the user engaged with the page (202)? If not, the user signal is ignored (204); else, the system sends encrypted behavioral information to the system regarding the user's personal temporal browsing history (206).

Thus, the system checks what the user does with the results (220; FIG. 20). For example, the system identifies if and what among the results the user clicks (222). Thus, the system collects information about what the user did and did not click on (224). There is also the notion of a dead query, which means the user could have decided not to click on anything and moved on (226). The system collects this information as well. As a result, the system either increases (228) or decreases (230) a docquery score for a document, i.e. the docquery score is increased for a selected document and decreased for a document that was not selected. In this way, the system scores specifically for the relationship between a particular document and a particular query. The system then processes the score and produces a new docquery score that is persisted for all real lists in the search index (232). The new score for each document is put in the personal search index (234) and the document is put into the document database (236). When the user performs a subsequent search, the most relevant results for that user are returned, e.g. the user's Apple ID. Why? Because I have an account on Apple.

Figure 21:
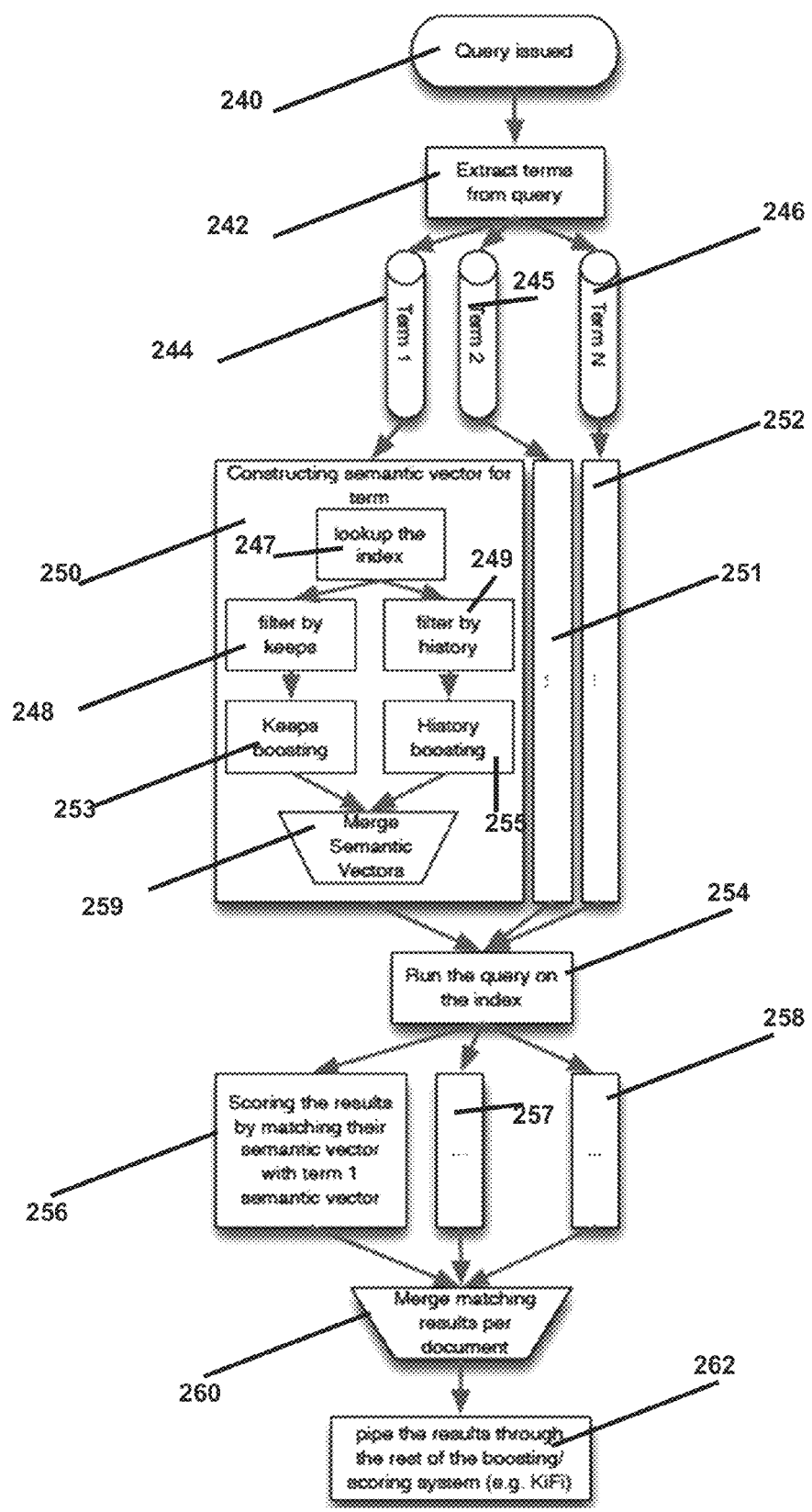
FIG. 21 is a flow diagram showing the use of a semantic vector according to the invention.

FIG. 21 is a flow diagram showing the use of a semantic vector according to the invention. In FIG. 21, a query is issued by a user (240) and terms are extracted from the query (242). For each term (244, 245, 246), semantic vector is then constructed (250, 251, 252). The term is looked up in an index of terms (247) and the term is filtered by both keeps (248) and history (249). Based on the Keeps and history, e.g. recency, of the term, the term is boosted (253, 255) and the resulting semantic vector scores are merged (259). The query is then run on the index (254). In this example, the query is run on the index for three different terms, although any number of terms can be used in embodiments of the invention. Each of the terms is then scored by matching their semantic vector with the term 1 results (256, 257, 258). Thereafter, the results are merged per document (260) and used in the overall scoring system (262) (see FIG. 18).

Figure 22:
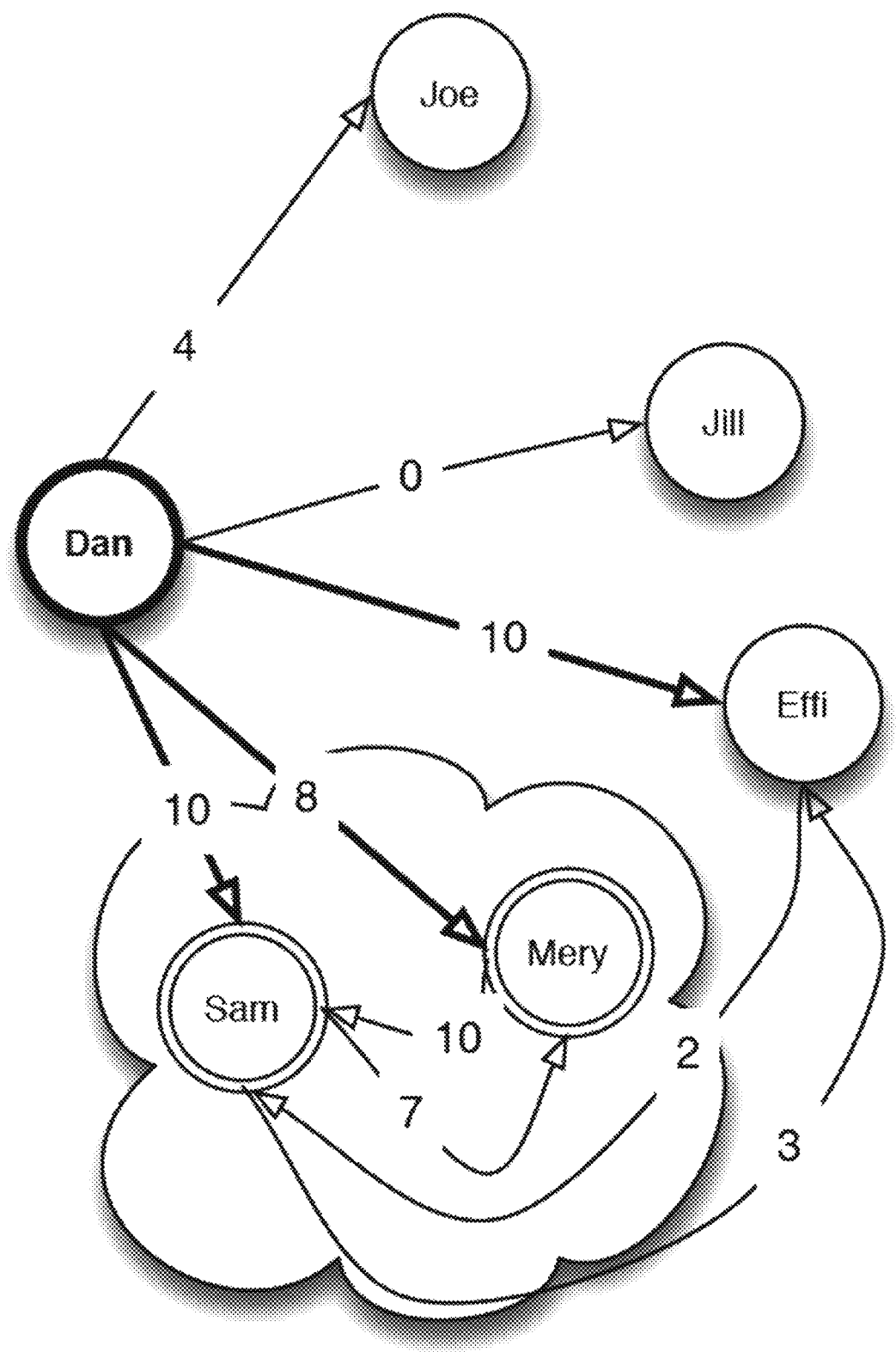
FIG. 22 is a topological diagram according to the invention that shows an expert network according to the invention.

FIG. 22 is a topological diagram according to the invention that shows an expert network for Dan. FIG. 22 is thus a personalized view of Dan's network that shows the relationship between different people known to Dan from Dan's perspective. Thus, Dan is connected to all of the five people shown in FIG. 22 who are expert on the basis of a score which indicates how Dan sees, for example, the strength of the relationship between, Joe, Jill, Effi, Mery, and Sam.

In this example, Sam performs a search query, e.g. for banjos, across a large document set and only receives six research results. Dan had kept four of the results. The system helps Dan determine who is an expert on banjos for purposes of Dan's query from Dan's point of view. The system looks at each document in the search results and checks how many clicks, e.g. how many times do Sam's friends visit each document. These results are multiplied by their rank. For example, Dan visited a page, kept it, and visited it ten times. In this example, the value of this document might result in it being ranked 10, the highest rank. This value is determined, for example, by counting the number of clicks or Keeps for each document.

The next step is among Dan's experts. Who are the relevant experts for this particular search? An embodiment of the invention aggregates the scores per person. If Sam has kept documents 1, 5, and 6, the number of scores is aggregated, resulting in the maximum number in this embodiment of the invention, i.e. 10, because of the interaction score of the document times the relevancy of documents 1 plus 5 plus 6.

Figure 23:
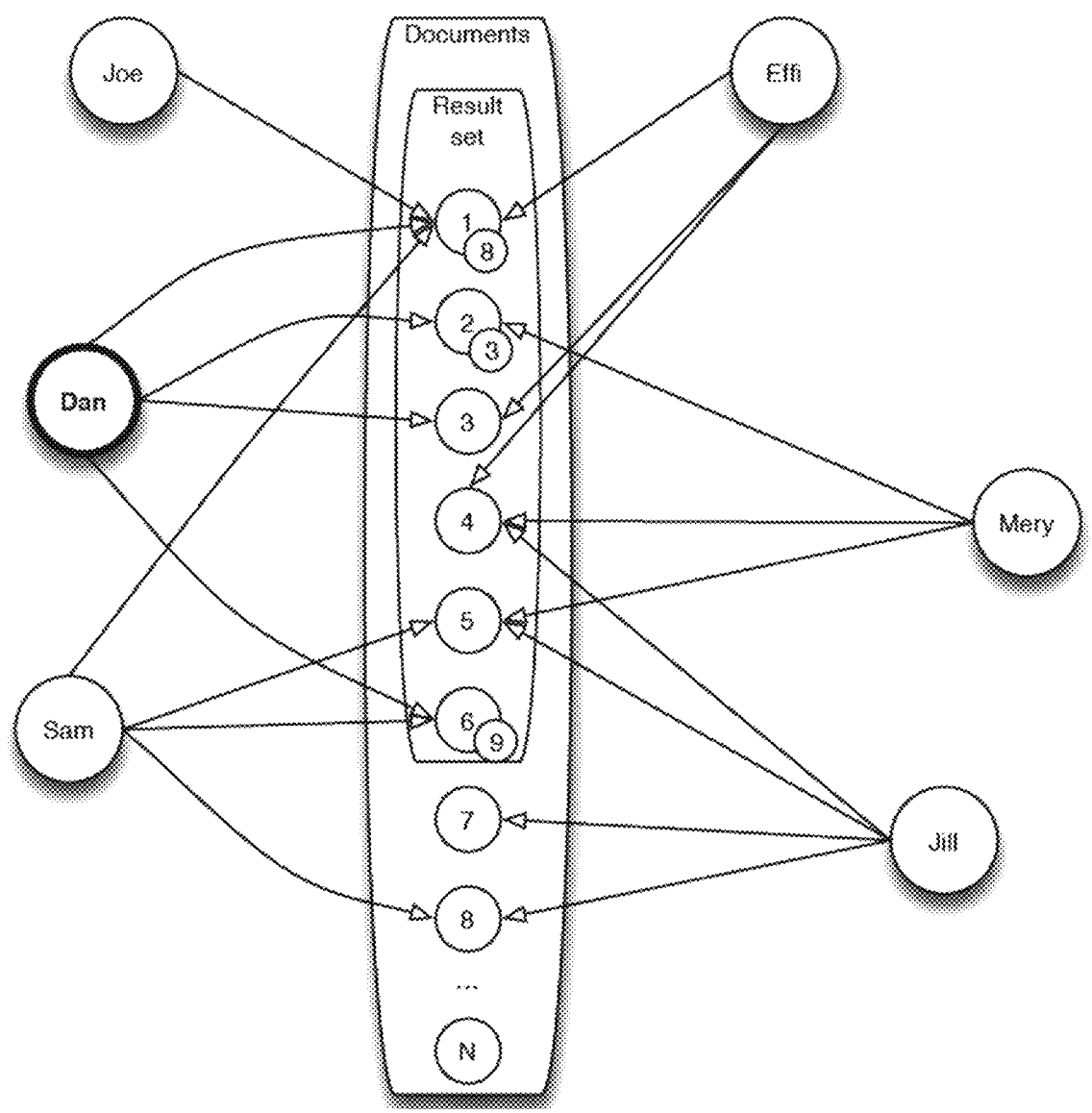
FIG. 23 is a topological representation of a document result set according to the invention.

FIG. 23 is a topological representation of a document result set relative to Dan and his friends. In this example, Mery kept one document that Dan kept, and the score is high, i.e. she gets 8. Effi also kept a couple of documents that Dan kept as well. So he gets a high score as well. Jill did not have an intersection with Dan's results, she did not keep anything that he kept, so she gets a zero. These values are based upon each person's Keeps, but could also be based on other factors, such as history, number of visits, a score based on interaction, combinations of factors, etc.

Overall what is the interaction Dan has with the documents that Sam kept? Is he an expert for banjos? This determination is made for each of Dan's friends. They have aggregated scores that indicate their personal expertise, e.g. with regard to banjos. The system can take the top experts, which are Sam and Effi, both of them have 10. The documents that they kept make them more valuable, so the system boosts their ranking. Because Sam is such an expert about Dan's ideas, then the documents he looked at should be boosted as well, perhaps even more because Dan missed them.

Effi could have landed on some of Dan's pages by accident, i.e. he keeps too many things, which doesn't mean that he's an expert. He just keeps so much. So if he keeps so much, one way to deal with that is to normalize Effi's keeps.

Thus, if Sam has only ten keeps and all of them were spot-on, then he's probably more valuable versus Effi who has 10,000 keeps and by accident he went to some of the same pages that Dan went to. Thus, the system allocates scores to find the expert network. In an embodiment, a set of rules is applied to determine who is the best expert and then to set up the expert network.

Computer Implementation

Figure 24:
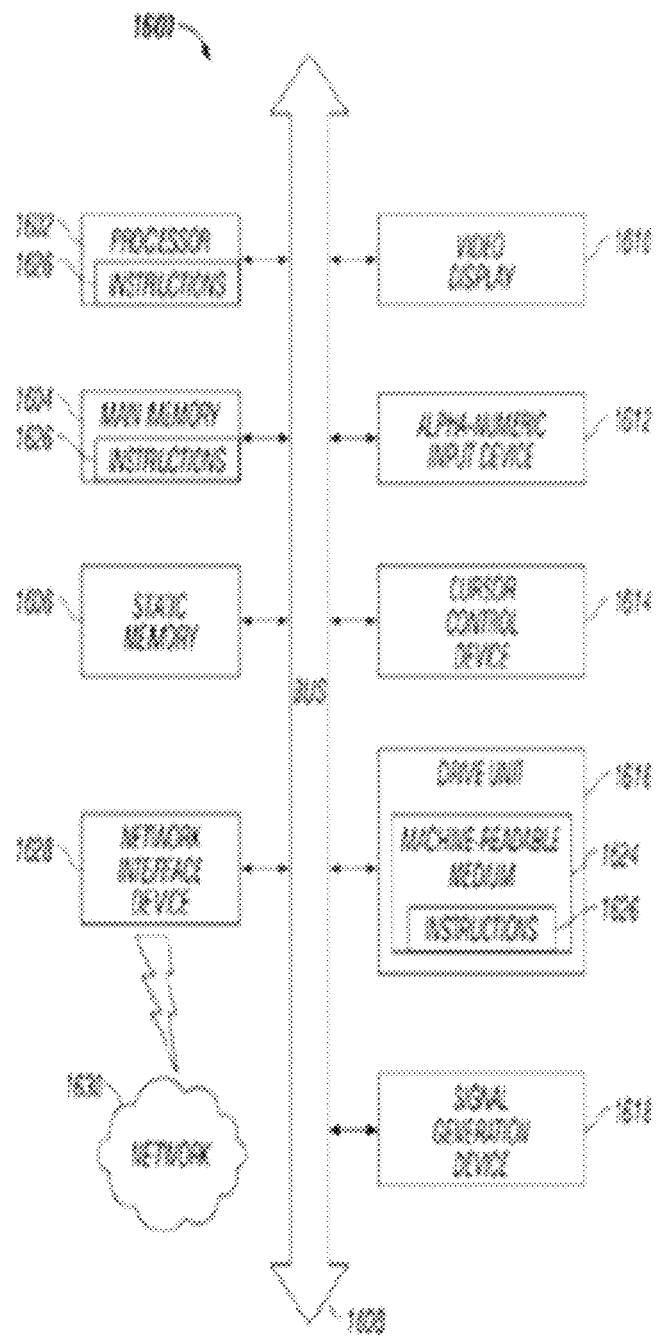
FIG. 24 is a block schematic diagram that depicts a machine in the exemplary form of a computer system within which a set of instructions for causing the machine to perform any of the herein disclosed methodologies may be executed.

FIG. 24 is a block schematic diagram that depicts a machine in the exemplary form of a computer system 1600 within which a set of instructions for causing the machine to perform any of the herein disclosed methodologies may be executed. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e., software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infra-red signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method for keeping and finding information, comprising:
   a processor extracting terms from a search query posited by a user;
   for each term, said processor constructing a semantic vector by:
      looking each term up in an index of terms;
      filtering each term relative to any documents or sites to which said user ascribes significance by keeping said document or site;
   based on said semantic vector, said processor determining whether said term is relevant to said query; and
   said processor providing a find engine for user access to information via both a find interface and a keep interface, wherein a user query posited via said find engine is satisfied independently of, but may incorporate among returned search results those search results generated by, previously or concurrently, querying an independent search engine.

2. A computer implemented method for personalizing results returned to a search query, comprising:
   a processor creating a semantic vector by examining words surrounding a query term in a document in context for said query term;
   wherein a semantic vector is created for every word in said document;
   said processor analyzing documents to which a user ascribes significance by the act of said user keeping said document;
   wherein a document kept by each user has a different semantic vector than that document has for each other user;
   said processor using said semantic vector for each term to personalize said search results for said user; and
   said processor providing a find engine for user access to information via both a find interface and a keep interface, wherein a user query posited via said find engine is satisfied independently of, but may incorporate among returned search results those search results generated by, previously or concurrently, querying an independent search engine.

3. The method of claim 1, further comprising:
   said processor generating a personal semantic vector for said user that comprises a subset of a corpus that is personal to said user;
   said processor comparing said term's semantic vector with said user's personal semantic vector; and
   based on said comparing, said processor determining whether said term is relevant.

4. The method of claim 1, further comprising:
   based on said documents or sites to which said user ascribes significance by keeping said document or site, said processor boosting one or more terms and merging resulting semantic vector scores.

5. The method of claim 1, further comprising:
   said processor executing said query on said index of terms for a plurality of different terms;
   said processor scoring each of said terms by matching a semantic vector for each term with query results for any one of said terms; and
   said processor merging said results per document for overall relevance scoring.

6. The method of claim 2, further comprising:
   said processor any of ranking and returning search results to said user in response to a subsequent query at least in part in accordance with documents that said user kept.

7. The method of claim 2, further comprising:
   pursuant to satisfying said query, said find interface accessing both a content search index and a personal search index and, substantially simultaneously, said keep interface accessing said personal search index;
   said content search index listing any of document content, user generated content, and said semantic vectors; and
   said personal search index listing any of user generated content, user explicit gestures, and user implicit gestures.

8. The method of claim 2, wherein said user explicit gestures comprise at least keeps that are captured via said keep interface and that consist of any of one or more documents and sites from among said search results to which said user ascribes significance by affirmatively keeping said document or site; and
   wherein said keeps are preserved in said personal search index as one or more persistent search objects to which metadata may be attached; and
   said processor any of ranking and returning search results to said user in response to a subsequent query at least in part in accordance with said keeps.

* * * * *